United States Patent
Lonsdorf et al.

(10) Patent No.: US 11,727,084 B1
(45) Date of Patent: Aug. 15, 2023

(54) TECHNIQUES FOR AUTOMATICALLY CONFIGURING WEB COMPONENTS

(71) Applicant: Salesforce, Inc., San Francisco, CA (US)

(72) Inventors: Brian Lonsdorf, San Francisco, CA (US); Scott Bokma, San Francisco, CA (US); Sönke Rohde, San Francisco, CA (US); Alan Martin Ross, San Francisco, CA (US); Michael Sollami, Cambridge, MA (US); David Woodward, Bozeman, MT (US); Jessica Lundin, Bellevue, WA (US)

(73) Assignee: Salesforce, Inc., San Francisco, CA (US)

(*) Notice: Subject to any disclaimer, the term of this patent is extended or adjusted under 35 U.S.C. 154(b) by 0 days.

(21) Appl. No.: 17/750,877

(22) Filed: May 23, 2022

(51) Int. Cl.
| | | |
|---|---|---|
| G06F 17/10 | (2006.01) | |
| G06F 16/958 | (2019.01) | |
| G06F 9/54 | (2006.01) | |
| G06F 40/154 | (2020.01) | |
| G06F 40/106 | (2020.01) | |
| G06N 20/00 | (2019.01) | |

(52) U.S. Cl.
CPC ............ *G06F 16/986* (2019.01); *G06F 9/547* (2013.01); *G06F 40/106* (2020.01); *G06F 40/154* (2020.01); *G06N 20/00* (2019.01)

(58) Field of Classification Search
CPC .... G06F 16/986; G06F 40/106; G06F 40/154; G06F 9/547; G06N 20/00
See application file for complete search history.

(56) References Cited

U.S. PATENT DOCUMENTS

| | | | | |
|---|---|---|---|---|
| 8,965,998 B1 * | 2/2015 | Dicker | ................... | G06N 20/00 |
| | | | | 705/26.81 |
| 9,372,858 B1 * | 6/2016 | Vagell | ................... | G06F 40/166 |
| 9,715,484 B1 * | 7/2017 | Joshi | ..................... | G06F 40/109 |
| (Continued) | | | | |

FOREIGN PATENT DOCUMENTS

WO   WO-2020092308 A1 *  5/2020  ............... G06F 8/38

OTHER PUBLICATIONS

Moran et al., Machine Learning-Based Prototyping of Graphical User Interfaces for Mobile Apps, IEEE Transactions on Software Engineering, vol. 46, No. 2, Feb. 2020 (Year: 2020).*

*Primary Examiner* — Shahid K Khan
(74) *Attorney, Agent, or Firm* — Holland & Hart LLP

(57) ABSTRACT

A method for data processing is described. The method includes receiving, from a client of a web service, a request for a web component included in a web page supported by the web service, where the web component is associated with a data structure that defines design characteristics of the web component. The method further includes determining configuration parameters that define stylistic characteristics of the web component based on data attributes of the web page and the data structure associated with the web component, where the configuration parameters are determined using a model trained on a corpus of web pages supported by the web service. The method further includes transmitting, to the client and in response to the request, an indication of the configuration parameters for the web component, where the indication is configured to display the web component according to the stylistic characteristics defined by the configuration parameters.

20 Claims, 14 Drawing Sheets

(56) References Cited

U.S. PATENT DOCUMENTS

| | | | |
|---|---|---|---|
| 10,353,989 B1* | 7/2019 | Hjortshoj | G06F 40/106 |
| 10,489,486 B2* | 11/2019 | Calvin | G06F 16/958 |
| 10,552,002 B1* | 2/2020 | Maclean | G06N 20/00 |
| 10,824,791 B2* | 11/2020 | Solis | G06F 40/143 |
| 11,074,044 B1* | 7/2021 | Schoppe | G06F 8/38 |
| 11,610,138 B2* | 3/2023 | Lundin | G06F 17/16 |
| 2002/0103856 A1* | 8/2002 | Hewett | H04L 69/329 709/219 |
| 2004/0107404 A1* | 6/2004 | Burns | G06F 16/986 707/E17.118 |
| 2004/0250205 A1* | 12/2004 | Conning | H04N 1/00196 707/E17.116 |
| 2005/0044490 A1* | 2/2005 | Massasso | G06F 40/106 715/234 |
| 2008/0126396 A1* | 5/2008 | Gagnon | G06F 40/186 707/999.102 |
| 2008/0201118 A1* | 8/2008 | Luo | G06F 16/958 703/2 |
| 2009/0106315 A1* | 4/2009 | Upendran | G06F 16/4393 |
| 2011/0083069 A1* | 4/2011 | Paul | H04N 21/2393 715/234 |
| 2012/0239598 A1* | 9/2012 | Cascaval | G06N 20/00 706/12 |
| 2014/0019887 A1* | 1/2014 | Boyer | G06F 16/972 715/760 |
| 2014/0282130 A1* | 9/2014 | Goldstein | G06F 3/0481 715/762 |
| 2014/0344666 A1* | 11/2014 | Bleakley | G06F 16/9574 715/234 |
| 2017/0098138 A1* | 4/2017 | Wang | G06F 18/24137 |
| 2017/0257464 A1* | 9/2017 | Mapes | G06F 16/986 |
| 2017/0344209 A1* | 11/2017 | Gordon | G06F 3/013 |
| 2018/0039907 A1* | 2/2018 | Kraley | G06V 30/414 |
| 2018/0203571 A1* | 7/2018 | Dayanandan | G06F 8/38 |
| 2018/0349109 A1* | 12/2018 | Brown | G06F 8/30 |
| 2019/0056917 A1* | 2/2019 | Bernal | G06N 20/00 |
| 2019/0245767 A1* | 8/2019 | Di Girolamo | H04L 69/164 |
| 2019/0250891 A1* | 8/2019 | Kumar | G06F 18/2411 |
| 2019/0266225 A1* | 8/2019 | Solis | G06F 16/972 |
| 2020/0133444 A1* | 4/2020 | Hou | G06F 16/906 |
| 2020/0133692 A1* | 4/2020 | Rohde | G06F 9/451 |
| 2020/0133693 A1* | 4/2020 | Rohde | G06F 3/167 |
| 2020/0134310 A1* | 4/2020 | Rohde | G06F 16/958 |
| 2020/0134388 A1* | 4/2020 | Rohde | G06N 5/022 |
| 2020/0341602 A1* | 10/2020 | Schoppe | G06F 3/0481 |
| 2020/0341779 A1* | 10/2020 | Rohde | G06F 8/20 |
| 2020/0341780 A1* | 10/2020 | Andolina | G06F 8/38 |
| 2020/0341781 A1* | 10/2020 | Schoppe | H04L 67/535 |
| 2020/0351176 A1* | 11/2020 | Venkiteswaran | G06F 16/953 |
| 2021/0240318 A1* | 8/2021 | Schoppe | G06F 3/0484 |
| 2021/0240451 A1* | 8/2021 | Schoppe | G06F 8/34 |
| 2022/0164524 A1* | 5/2022 | Lunaparra | G06F 3/0484 |
| 2023/0005051 A1* | 1/2023 | Vg | G06F 3/0482 |

* cited by examiner

TECHNIQUES FOR AUTOMATICALLY CONFIGURING WEB COMPONENTS

FIELD OF TECHNOLOGY

The present disclosure relates generally to database systems and data processing, and more specifically to techniques for automatically configuring web components.

BACKGROUND

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various client devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

A cloud platform may support web services for digital content providers. In some cases, if a digital content provider wants to include the same user interface (UI) component in two different web pages, the digital content provider may be required to design each UI component separately. Re-designing the same UI component for different web pages may result in higher development costs, increased latency, and decreased user satisfaction.

DETAILED DESCRIPTION

Figure 1:
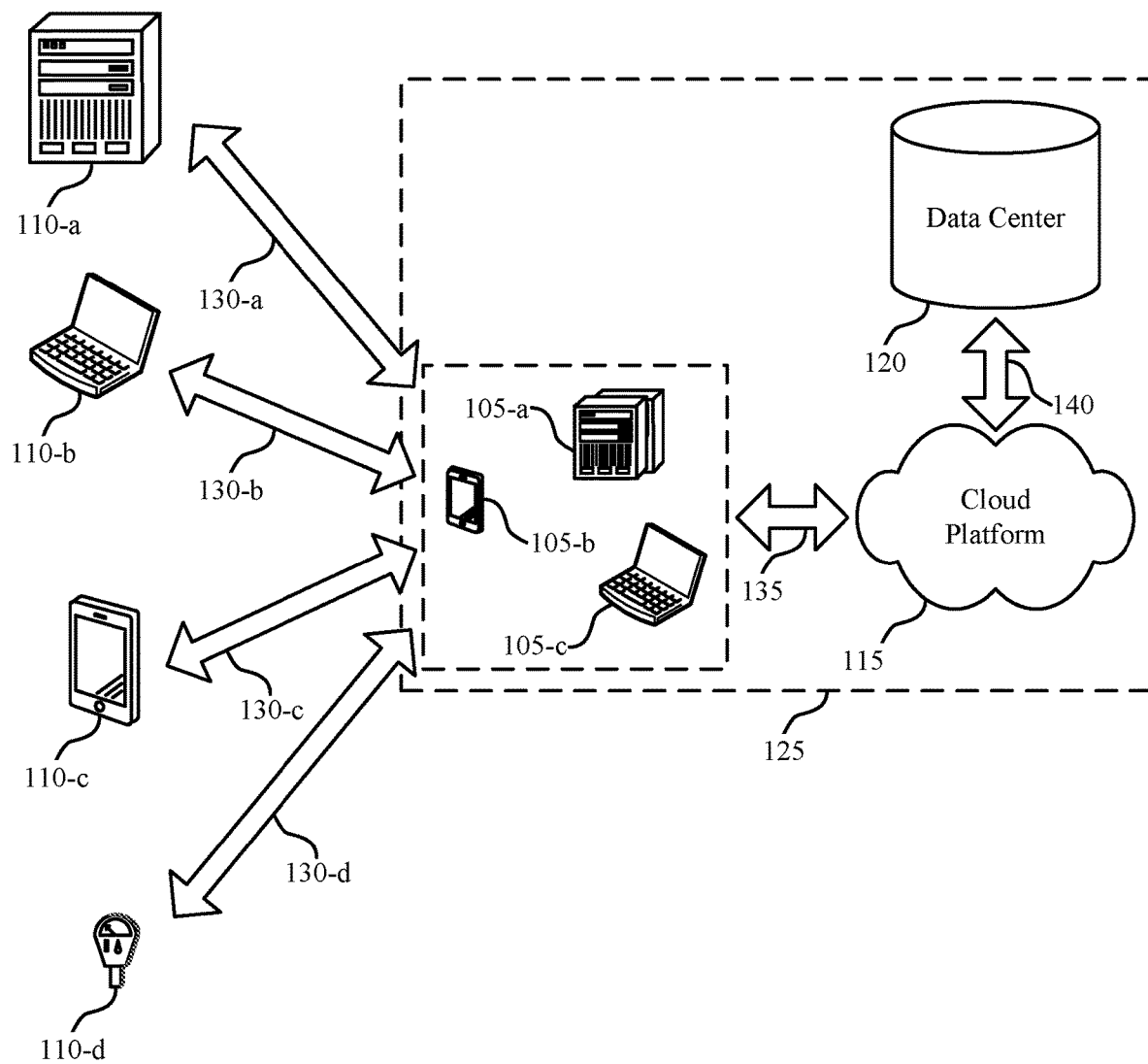
FIGS. 1 through 3 illustrate examples of data processing systems that support techniques for automatically configuring web components in accordance with aspects of the present disclosure.

A cloud platform may host web pages for digital content providers. These web pages may include various user interface (UI) components such as tables, lists, search bars, and navigation menus. A UI component may have an underlying data structure (equivalently referred to herein as a skeleton) and a style (equivalently referred to herein as a theme). The style of a UI component may generally refer to the fonts, spacings, borders, colors, and alignments used to display the UI component. In some cases, different web pages hosted by the cloud platform may include UI components with the same data structure. For example, two websites hosted by the cloud platform may have navigation menus (with the same underlying skeleton) that are displayed using different styles.

When a client device visits a web page hosted by the cloud platform, the cloud platform may provide the client device with information that enables the client device to properly display UI components (equivalently referred to as web components) in the web page. More specifically, the cloud platform may provide the client device with a skeleton (e.g., component structure) and style (e.g., component theme) for each UI component in the web page. If, however, the client device navigates to a different web page that includes similar UI components (e.g., UI components with the same structure), the client device may re-download the same skeleton again. Thus, navigating between web pages with the same or similar UI components may result in signaling overhead and slow user experience. Moreover, web developers may be unable to re-use the same UI component across different web pages without manually configuring the UI component for each web page.

Aspects of the present disclosure provide for automatically theming UI components across different web pages hosted by a web service. To support the techniques described herein, the web service may use a combination of application programming interfaces (APIs) and machine learning techniques to automatically determine (e.g., predict) a style for a UI component within a web page. For example, the web service may use one or more browser APIs may perform a segmentation procedure on a web page by dividing the web page into constituent sections and analyzing the styles (e.g., fonts, colors, layouts) in each section. The web service may use this information to generate a style guide for the web page, and may automatically theme UI components in the web page according to the style guide.

The web service may also predict the style for a UI component by using a machine learning model that is trained on a corpus of webpages supported by the web service. The corpus of webpages may include labels and annotations that enable the machine learning model to efficiently identify UI components with the same underlying structure. The machine learning model may generate a dataset for the UI component by searching through the corpus of web pages and identifying comparable UI components. For example, the machine learning model may generate a dataset for a navigation list by searching the corpus of web pages and identifying similar navigation lists in other web pages. Using APIs and machine learning techniques to automatically theme UI components in accordance with the described techniques may enable web developers to design and style web components with reduced manual interaction, among other benefits.

In addition to reducing the amount of manual interaction associated with designing and styling different web pages, the techniques described herein may also enable a client device to locally cache and re-use UI components across different web pages hosted by the cloud platform. For example, if a client device navigates between two web pages that include the same (or similar) UI components, the client device may locally cache and re-use UI components from the first web page when rendering the second web page, which may reduce the latency associated with retrieving and displaying the second web page. More specifically, the client device may re-use the skeleton of a UI component from the first web page and automatically style the UI component according to a theme of the second web page. Thus, the client device may display the same UI component across different web pages without re-downloading the UI component each time.

Aspects of the disclosure are initially described in the context of data processing systems and process flows. Aspects of the disclosure are further illustrated by and described with reference to apparatus diagrams, system diagrams, and flowcharts that relate to techniques for automatically configuring web components.

FIG. 1 illustrates an example of a data processing system 100 for cloud computing that supports techniques for automatically configuring web components in accordance with various aspects of the present disclosure. The data processing system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a computing device, such as a server (e.g., cloud client 105-*a*), a smartphone (e.g., cloud client 105-*b*), or a laptop (e.g., cloud client 105-*c*). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level, and may not have access to others.

Contacts 110 may interact with the cloud client 105 in person or via phone, email, web, text messages, mail, or any other appropriate form of interaction (e.g., interactions 130-*a*, 130-*b*, 130-*c*, and 130-*d*). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-*a*), a laptop (e.g., contact 110-*b*), a smartphone (e.g., contact 110-*c*), or a sensor (e.g., contact 110-*d*). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with interactions 130 from the cloud client 105 over network connection 135, and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured). Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

Some UI components such as tables, lists, search bars, or navigation fields may be rebuilt across different teams, companies, or organizations. In some cases, these components are rebuilt to provide different functionality. In other cases, however, UI components are rebuilt to attain a desired style or theme. If a UI component can be adequately themed to satisfy design standards of a web development team, manually theming UI components may result in latency, redundancy, and extraneous resource consumption (due to the volatility of customizing code owned by a different developer). Moreover, since these components are rebuilt separately (e.g., as unique versions), contacts 110 that interact with these web pages may be unable to cache or re-use UI components across different web pages. For example, if a contact 110 visits multiple web pages with the same UI components, the contact 110 may re-download each UI component multiple times, which may result in a slow user experience. Existing design systems that employ cascading style sheet (CSS) custom properties and customizable UI libraries to automatically theme web pages may be unable to successfully mitigate these issues.

Aspects of the present disclosure generally provide for automatically theming or styling web components at a client device. To support the techniques described herein, a web service supported by a cloud platform 115 may use UI components that are dynamically styled or themed at run-time. To support client-side automatic theming, the web service may develop a style guide for a web page, obtain a dataset of various UI components from other web pages, and generate a skeleton (also referred to herein as a data structure) for a UI component. The web service may automatically theme (apply styles to) the UI component based on the dataset, the style guide, and the skeleton.

The techniques described herein may enable clients of a web service (e.g., web developers, web page designers, creative teams) to design and style web pages with reduced manual interaction. For example, if a client adds a data table to a web page, the web service (e.g., the web service 205 described with reference to FIG. 2) may detect that the client is adding the data table to the web page, and may use one or more browser APIs to analyze both the data table and the web page. More specifically, the web service may use the one or more browser APIs to perform a page segmentation procedure on the web page. This process may enable the web service to derive or extract data attributes (color schemes, fonts, borders, spacings) from the web page. Additionally, or alternatively, the web service may identify structural attributes of the data table (layout, orientation, location), and may use a trained machine learning model to search through a corpus of labeled web pages for web components with the same or similar attributes. The web service may predict a style for the data table based on the information provided by the browser APIs and the machine learning model, and may display or transmit an indication of the predicted style to the client. As such, the client (e.g., a web developer) may automatically theme the data table using the style predicted by the web service (rather than manually formatting the data table).

It should be appreciated by a person skilled in the art that one or more aspects of the disclosure may be implemented in the data processing system 100 to solve problems other than those described above. Furthermore, aspects of the disclosure may provide technical improvements to "conventional" systems or processes, as described herein. However, the description and appended drawings only include example technical improvements resulting from implementing aspects of the disclosure, and accordingly do not represent all of the technical improvements provided within the scope of the claims.

Figure 2:
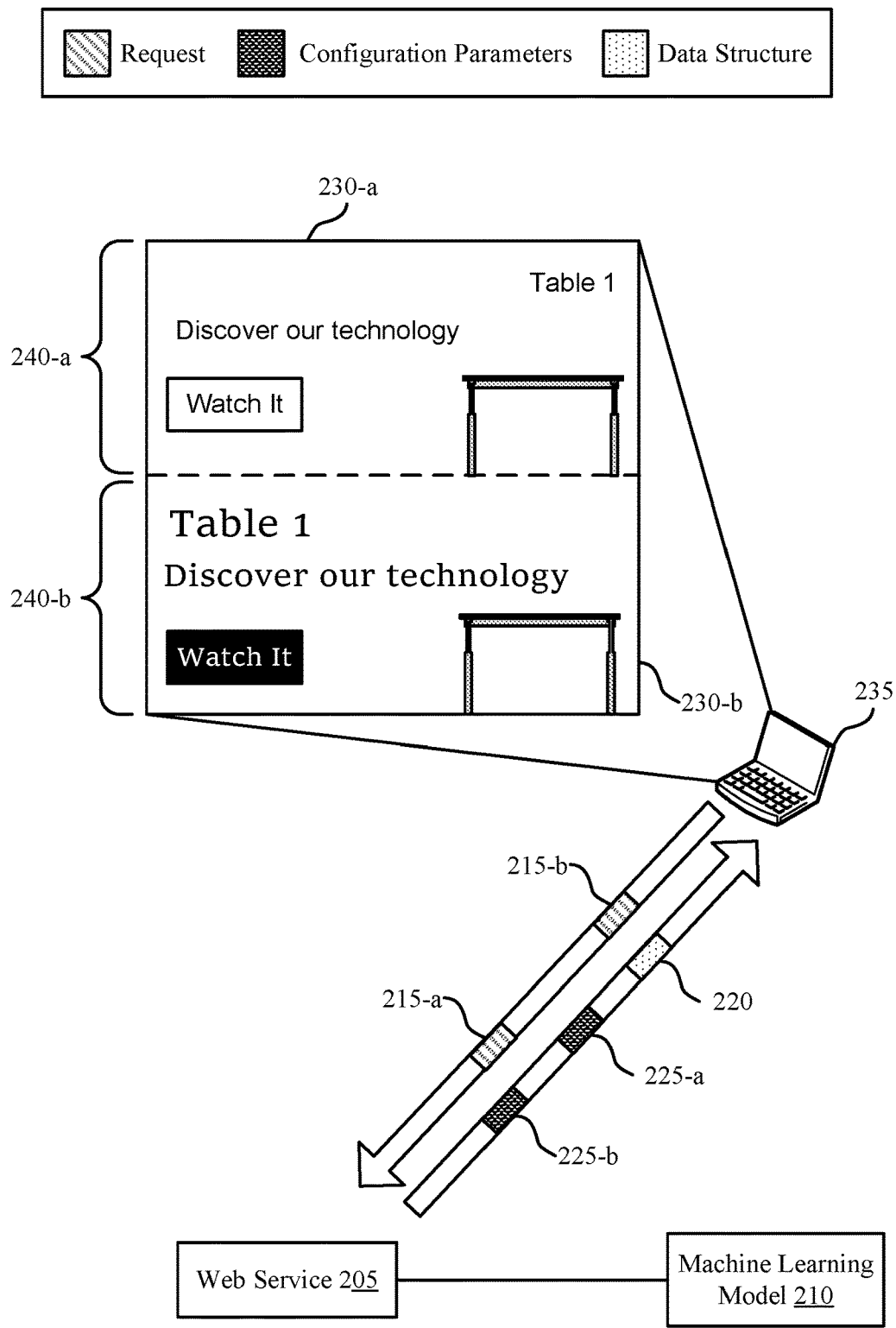

FIG. 2 illustrates an example of a data processing system 200 that supports techniques for automatically configuring web components in accordance with aspects of the present disclosure. The data processing system 200 may implement or be implemented by aspects of the data processing system 100, as described herein with reference to FIG. 1. For example, the data processing system 200 may include a client device 235, which may be an example of a contact 110 described with reference to FIG. 1. The data processing system 200 may also include a web service 205, which may be supported by one or more cloud platforms 115, physical servers, virtual machines, physical machines, or the like, or various combinations thereof. In the data processing system 200, the client device 235 may locally cache and automatically theme web components 230.

The client device 235 may transmit (to the web service 205) a request 215-a for a web component 230-a within a first web page supported by the web service 205. The web service 205 may determine configuration parameters 225-a that define stylistic characteristics 240-a (e.g., colors, fonts, alignments, spacings) for the web component 230-a based on data attributes of the first web page and a data structure 220 (e.g., skeleton) of the web component 230-a. The data attributes of the first web page may include styles (color schemes, layouts, component orientations, patterns) used throughout the first webpage. The web service 205 may identify the data attributes of the first web page by using various web or browser APIs to perform a page segmentation procedure on the first web page. After segmenting the first web page, the web service 205 may extract different styles that are used in each section of the first web page.

In some examples, the web service 205 may use a machine learning model 210 to determine the configuration parameters 225-a for the web component 230-a (as described with reference to FIG. 3). The web service 205 may transmit an indication of the configuration parameters 225-a to the client device 235. Additionally, or alternatively, the web service 205 may transmit an indication of the data structure 220 to the client device 235. In some examples, the client device 235 may automatically determine the configuration parameters 225-a at run-time (as opposed to receiving the configuration parameters 225-a from the web service 205).

The client device 235 may receive the configuration parameters 225-a from the web service 205 and display the web component 230-a according to the stylistic characteristics 240-a defined by the configuration parameters 225-a. For example, the client device 235 may display the web component 230-a using a first combination of fonts, colors, alignments, borders, and spacings defined by the configuration parameters 225-a. In some examples, the client device 235 may use JavaScript hooks embedded in the data structure 220 of the web component 230-a to apply (e.g., inject) the stylistic characteristics 240-a to the web component 230-a. As described herein, the client device 235 may store the data structure 220 of the web component 230-a such that the client device 235 can re-use the data structure 220 for other web components with the same skeleton.

The client device 235 may also transmit a request 215-b for a web component 230-b within a second web page supported by the web service 205 (e.g., by navigating from the first web page to the second web page). In response to the request 215-b, the web service 205 may use browser APIs and the machine learning model 210 to implicitly determine (predict) configuration parameters 225-b for the web component 230-b. The web service 205 may determine the configuration parameters 225-b (e.g., a theme) for the web component 230-b based on attributes (e.g., colors, shapes, fonts, borders) of the second web page and the data structure of the web component 230-b. In some examples, the web service 205 may determine the configuration parameters 225-b for the web component 230-b by using the machine learning model 210 to search through a corpus of annotated web pages and extract stylistic information from similar web components (e.g., web components with the same skeleton).

In some examples, the web service 205 may transmit an indication of the configuration parameters 225-b to the client device 235. Alternatively, the client device 235 may automatically determine the configuration parameters 225-b at run-time (instead of receiving the configuration parameters 225-b from the web service 205). The configuration parameters 225-b may define stylistic characteristics 240-b for the web component 230-b. If, for example, the web component 230-a and the web component 230-b are associated with the same skeleton, the client device 235 may render (e.g., display) the web component 230-b using the data structure 220 stored in a cache of the client device 235. More specifically, the web service 205 may display the web component 230-b according to the data structure 220 (stored in the cache) and the configuration parameters 225-b. As illustrated in the example of FIG. 2, the stylistic characteristics 240-a for the web component 230-a may be different from the stylistic characteristics 240-b for the web component 230-b even though both web components 230 are associated with the same data structure 220.

Aspects of the data processing system 200 may be implemented to realize one or more of the following advantages. The techniques described with reference to FIG. 2 may enable web developers and digital content providers to design and style UI components (such as the web components 230) with reduced manual interaction. More specifically, the described techniques may enable the web service 205 to automatically theme different UI components in a web page by using web APIs and the machine learning model 210 to extract style information from the web page and other comparable web pages. Moreover, aspects of the data processing system 200 may enable the client device 235 to locally cache and re-use UI components across different web pages, which may reduce the latency and signaling overhead associated with rendering these web pages at the client device 235.

Figure 3:
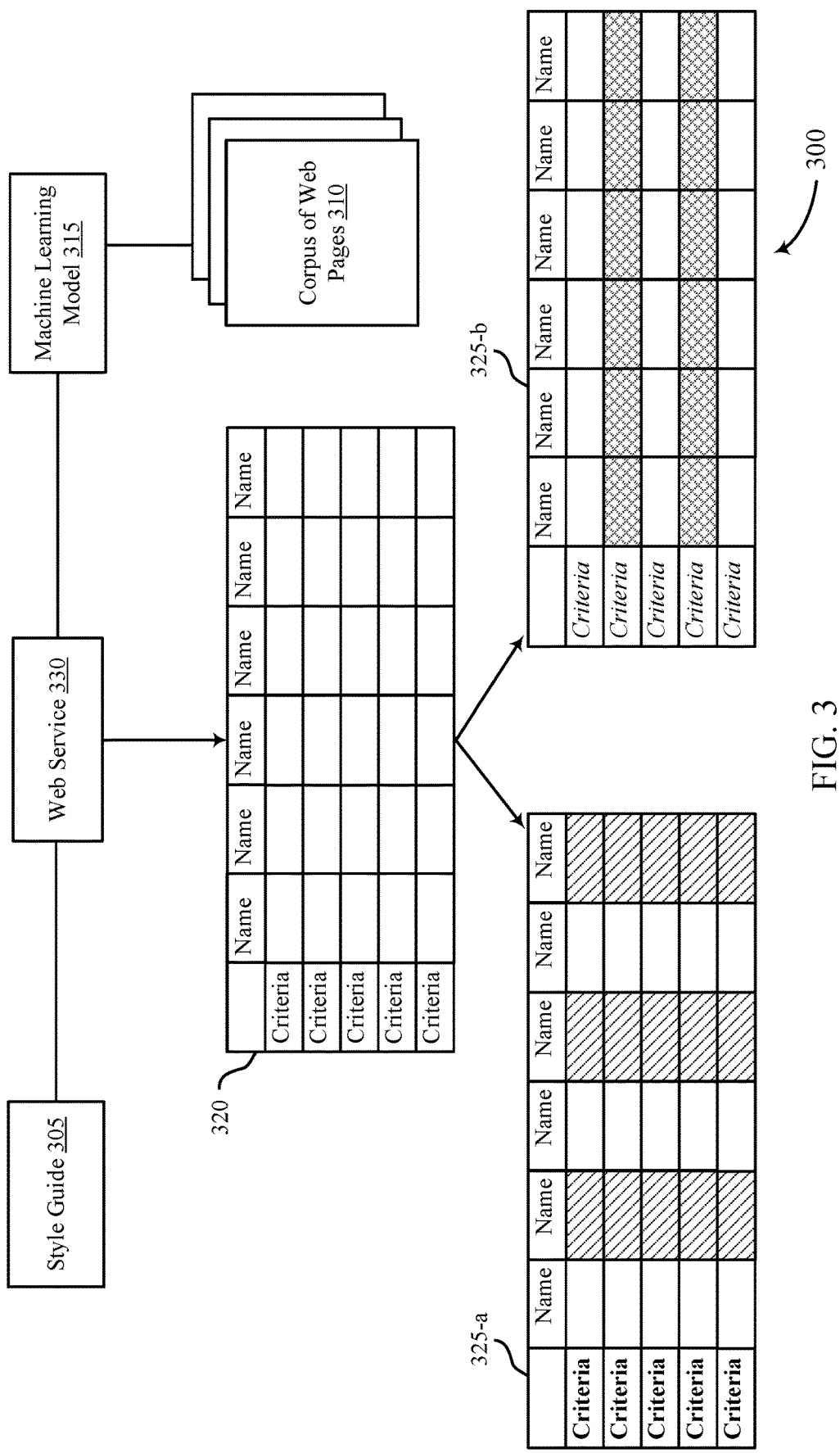

FIG. 3 illustrates an example of a data processing system 300 that supports techniques for automatically configuring web components in accordance with aspects of the present disclosure. The data processing system 300 may implement or be implemented by aspects of the data processing system 100 or the data processing system 200, as described herein with reference to FIGS. 1 and 2. For example, the data processing system 300 may include a machine learning model 315, which may be an example of a machine learning model 210 described with reference to FIG. 2. The data processing system 300 may also include web components 325, which may be examples of web components 230 described with reference to FIG. 2. In the example of FIG. 3, a web service 330 may use a style guide 305 and a corpus of web pages 310 to predict different styles for web components 325 with the same data structure 320.

The web service 330 (also referred to herein as a content delivery network or a digital content service) may use the machine learning model 315 to determine stylistic characteristics (e.g., stylistic characteristics 240 described with reference to FIG. 2) for web components 325. The machine learning model 315 may be trained using a corpus of web pages 310 that include labels or annotations. In accordance with the described techniques, the web service 330 may generate a style guide 305 for a web page by using browser APIs such as getComputedStyle( ) or getBoundingClientRect( ) to divide the web page into constituent sections. The web service 330 may use these browser APIs to identify data attributes (color schemes, layouts, patterns, fonts) of the web page. Using the same APIs, the web service 330 may derive (e.g., predict) styles for the web components 325. More specifically, the web service 330 may use the data attributes of the web page (identified by the browser APIs) and the machine learning model 315 to determine a style for each of the web components 325. Thus, the web service 330 may use reverse engineering techniques to generate the style guide 305 by performing a page segmentation process on the web page. The style guide 305 may indicate where different styles are used within the web page, how the styles are used in relation to each other, what data is displayed using which styles, and how frequently each style is used, among other examples.

The web service 330 may use the machine learning model 315 to obtain a dataset for the web components 325. More specifically, the machine learning model 315 may search through the corpus of web pages 310 (also referred to as a prior collection) to identify other web components 325 with the same data structure 320. The machine learning model 315 may parse (e.g., search, analyze) thousands of labeled web pages to obtain a dataset for the web components 325. In some examples, the machine learning model 315 may query segmented components within the corpus of web pages 310 using various heuristic descriptions. For example, if the machine learning model 315 is compiling (e.g., collecting, obtaining) a dataset for a navigation menu, the machine learning model 315 may be configured to search the left and top sections of web pages in the corpus of web pages 310 (because navigation menus are typically located in these sections).

The web service 330 may generate a data structure 320 (e.g., the data structure 220 described with reference to FIG. 2) for the web components 325 based on the style guide 305 and the dataset obtained by the machine learning model 315. The data structure 320 may use hypertext markup language (HTML) annotations to describe elements within the data structure 320. The data structure 320 may also include JavaScript hooks that can be used for style injection. The data structure 320 may be an example of a functional web component without stylistic characteristics. The style guide 305 and the data structure 320 may enable a client device (e.g., the client device 235 described with reference to FIG. 2) to perform client-side auto-theming. At run-time, a JavaScript-based library may monitor document object model (DOM) changes through a MutationObserver and dynamically inject (apply) a style to the web components 325. The client device may use JavaScript hooks within the data structure 320, the dataset of web components extracted from the corpus of web pages 310, and the style guide 305 to automatically style (e.g., configure) the web components 325. In some examples, this style can be stored (e.g., cached) and re-used at the client device. Alternatively, the style can be predicted each time the client device navigates to a different web page.

In the example of FIG. 3, a web component 325-a and a web component 325-b may have the same data structure 320. The web component 325-a may be included in a first web page supported by the web service 330, whereas the web component 325-b may be included in a second web page supported by the web service 330. As described herein, a client device may automatically theme the web component 325-a and the web component 325-b by using web APIs to extract stylistic information from the first web page and the second web page. The web components 325 may have the same structural configuration and different stylistic configurations. For example, the web component 325-a may be displayed using a first combination of font types, text alignments, and color schemes (which correspond to a theme of the first web page), while the web component 325-b may be displayed using a second combination of font types, text alignments, and color schemes (which correspond to a theme of the second web page).

Aspects of the data processing system 300 may be implemented to realize one or more of the following advantages. The techniques described with reference to FIG. 3 may enable web developers and digital content providers to design and style UI components (such as the web components 325) with reduced manual interaction. More specifically, the described techniques may enable the web service 330 to automatically theme different UI components by using web APIs and the machine learning model 315 to generate the style guide 305 and the data structure 320. Moreover, aspects of the data processing system 300 may enable a user device to locally cache and re-use UI components across different web pages, which may reduce the latency and signaling overhead associated with rendering these web pages at the user device.

Figure 4:
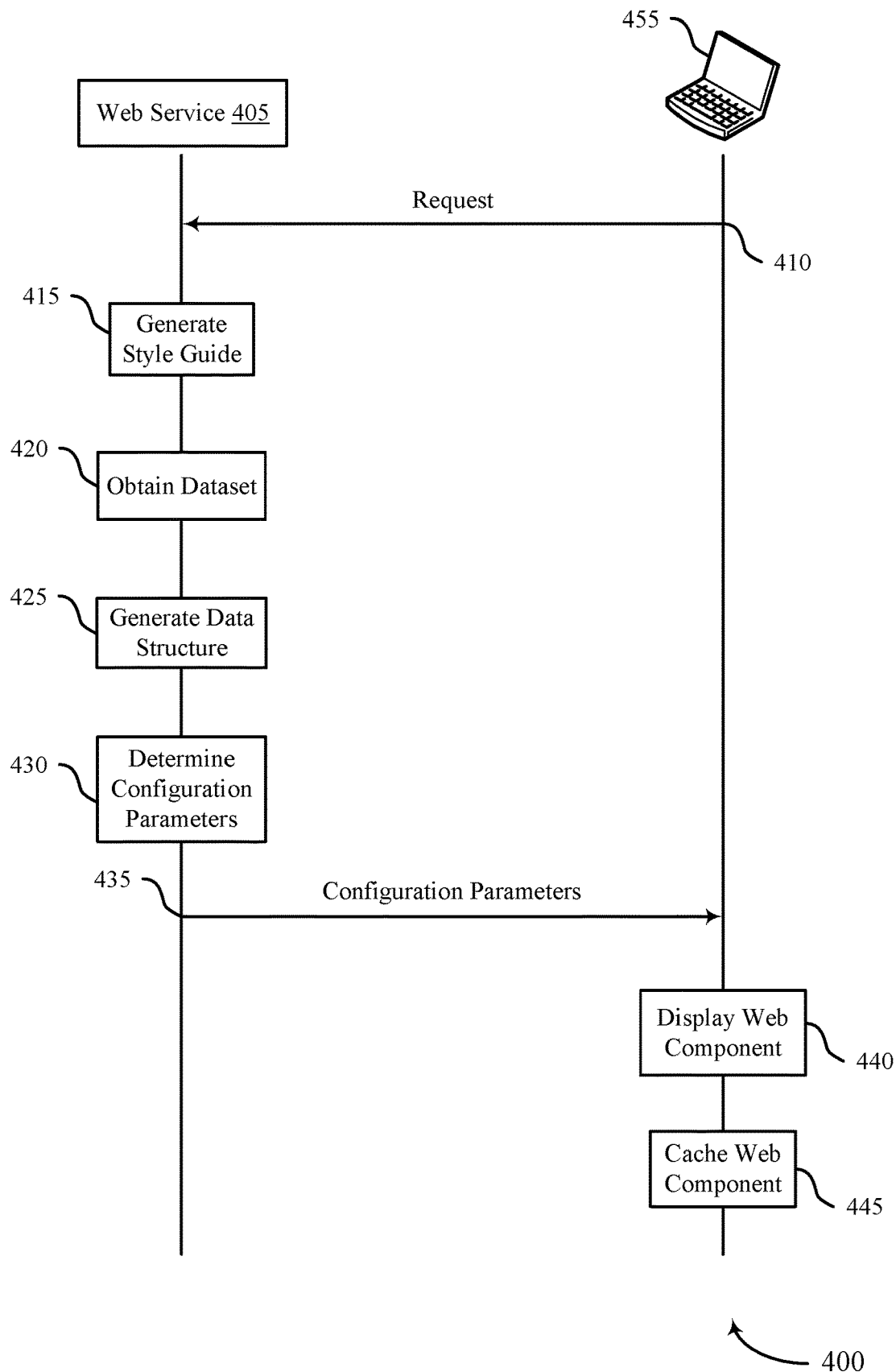
FIG. 4 illustrates an example of a process flow that supports techniques for automatically configuring web components in accordance with aspects of the present disclosure.

FIG. 4 illustrates an example of a process flow 400 that supports techniques for automatically configuring web components in accordance with aspects of the present disclosure. The process flow 400 may implement or be implemented by aspects of the data processing system 100, the data processing system 200, or the data processing system 300, as described herein with reference to FIGS. 1 through 3. For example, the process flow 400 may include a web service 405, which may be an example of a web service 205 or a web service 330 described with reference to FIGS. 2 and 3. Likewise, the process flow 400 may include a client device 455, which may be an example of a client device 235 described with reference to FIG. 2. In the following description of the process flow 400, operations between the web service 405 and the client device 455 may be performed in a different order or at a different time than shown. Additionally, or alternatively, some operations may be omitted from the process flow 400, and other operations may be added to the process flow 400.

At 410, the client device 455 may transmit a request for a web component in a web page supported by the web service 405. As described herein, the web service 405 may be an example of a content delivery network, a content distribution system, a cloud service, or the like. The client device 455 may be an example of a laptop, a mobile device, a server, a physical machine, a virtual machine, or a similar computing device. The client device 455 and the web service 405 may be implemented in the same or different computing systems. The web component may be an example of a data table, a navigation menu, a banner, a product tile, a search bar, or the like.

At 415, the web service 405 may generate a style guide (e.g., the style guide 305 described with reference to FIG. 3) for the web page associated with the web component. The style guide may indicate where different styles are used within the web page, how the styles are used in relation to each other, what data is displayed using which styles, and how frequently each style is used, among other examples. The web service 405 may generate the style guide for the web page by using browser APIs to divide the web page into sections and identify the stylistic properties used in each constituent section.

At 420, the web service 405 may obtain a dataset for the web component by using a trained machine learning model (e.g., the machine learning model 315 described with reference to FIG. 3) to identify similar web components within a corpus of web pages supported by the web service, to generate styling parameters (or recommended styling parameters) for the web component, or both. The machine learning model may use various heuristic models to parse the corpus of web pages and extract stylistic attributes (e.g., font, color, spacing, alignment) from other web components with the same underlying data structure. In some examples, the corpus of web pages may include labels or annotations that are used to train the machine learning model.

At 425, the web service 405 may determine a data structure (e.g., the data structure 320 described with reference to FIG. 3) for the web component. The data structure may include one or more JavaScript hooks that are used to inject stylistic properties into the web component. The data structure of the web component may be defined by one or more HTML annotations. At 430, the web service 405 may determine a style for the web component based on the style guide (generated using browser APIs) and the dataset (obtained by the machine learning model). The style of the web component may refer to a combination of configuration parameters (e.g., the configuration parameters 225 described with reference to FIG. 2) used to display the web component at the client device 455. These configuration parameters may include a font, a font size, a font color, a background color, a text alignment, or a line spacing, among other examples. The configuration parameters be defined by various HTML and CSS properties.

At 435, the web service 405 may transmit an indication of the configuration parameters (e.g., the predicted style) to the client device 455. The indication may be configured to display the web component (at a UI of the client device 455) according to the stylistic properties (font, color, alignment, layout) defined by the configuration parameters. In some examples, the client device 455 may automatically determine the configuration parameters for the web component (as opposed to receiving an indication of the configuration parameters from the web service 405). For example, the client device 455 may determine a style for the web component based on a theme of the web page and a data structure of the web component. At 440, the web component may be displayed at a UI of the client device 455 according to the configuration parameters and the data structure of the web component.

At 445, the client device 455 may locally cache at least a portion of the web component (e.g., the skeleton) such that the client device 455 can re-use the locally cached data for other web components with the same data structure. For example, if the client device 455 navigates to a second web page that includes a second web component associated with the same data structure, the client device 455 may display the second web component using the locally cached data (rather than downloading the second web component from the web service 405). In some examples, the client device 455 may dynamically theme the second web component according to a theme of the second web page.

Aspects of the process flow 400 may be implemented to realize one or more of the following advantages. The techniques described with reference to FIG. 4 may enable web developers and digital content providers to design and style UI components (such as the web components 325 described with reference to FIG. 3) with reduced manual interaction. More specifically, the described techniques may enable the web service 405 to automatically theme different UI components in a web page by using browser APIs and machine learning techniques to extract style information from the web page and other comparable web pages. Moreover, aspects of the process flow 400 may enable the client device 455 to locally cache and re-use UI components across different web pages, which may reduce the latency and signaling overhead associated with rendering these web pages at the client device 455.

Figure 5:
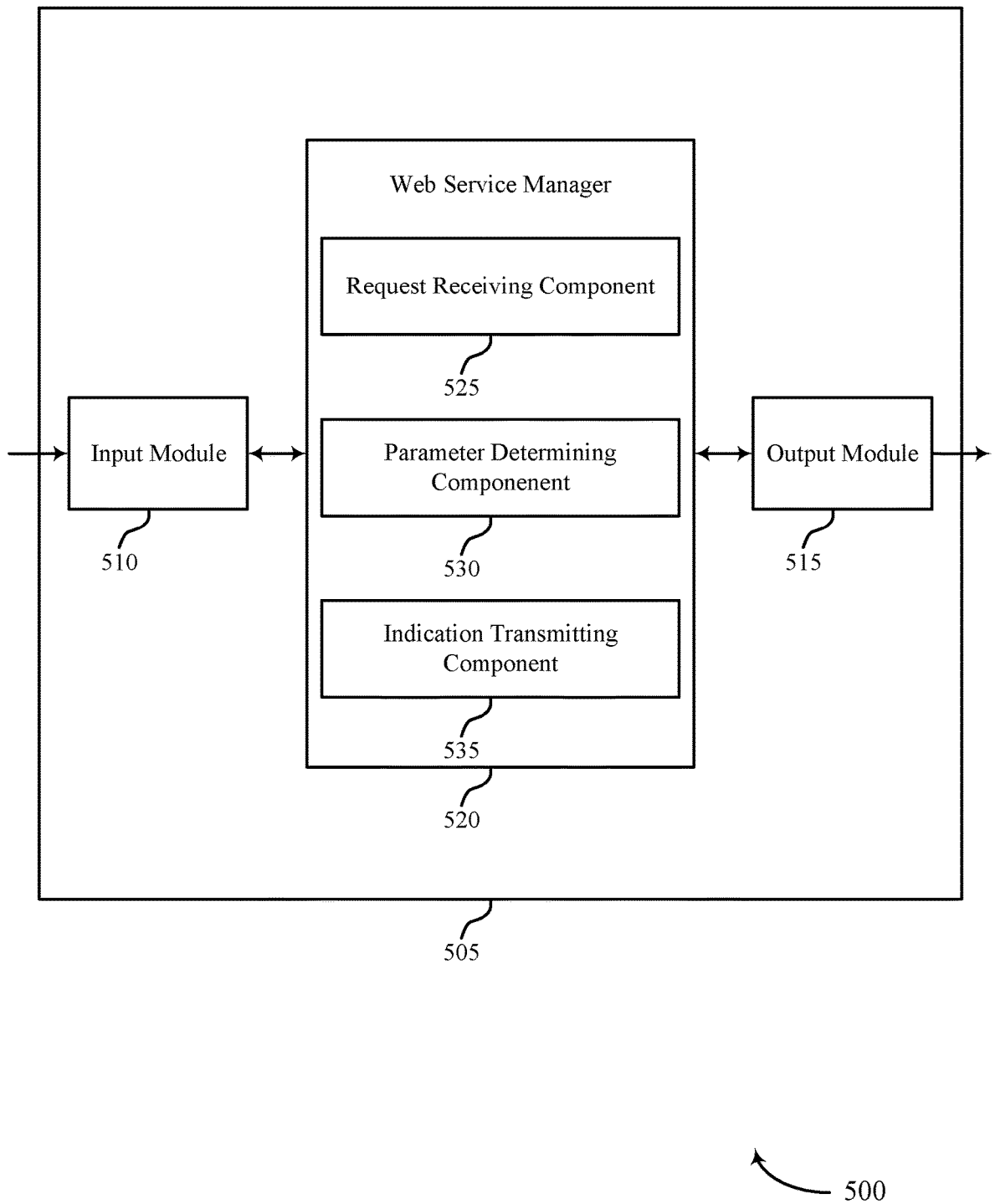
FIG. 5 shows a block diagram of an apparatus that supports techniques for automatically configuring web components in accordance with aspects of the present disclosure.

FIG. 5 shows a block diagram 500 of a device 505 that supports techniques for automatically configuring web components in accordance with aspects of the present disclosure. The device 505 may include an input module 510, an output module 515, and a web service manager 520. The device 505 may also include a processor. Each of these components may be in communication with one another (e.g., via one or more buses).

The input module 510 may manage input signals for the device 505. For example, the input module 510 may identify input signals based on an interaction with a modem, a keyboard, a mouse, a touchscreen, or a similar device. These input signals may be associated with user input or processing at other components or devices. In some cases, the input module 510 may utilize an operating system such as iOS®, ANDROID®, MS-DOS®, MS-WINDOWS®, OS/2®, UNIX®, LINUX®, or another known operating system to handle input signals. The input module 510 may send aspects of these input signals to other components of the device 505 for processing. For example, the input module 510 may transmit input signals to the web service manager 520 to support techniques for automatically configuring web components. In some cases, the input module 510 may be a component of an input/output (I/O) controller 710, as described with reference to FIG. 7.

The output module 515 may manage output signals for the device 505. For example, the output module 515 may receive signals from other components of the device 505, such as the web service manager 520, and may transmit these signals to other components or devices. In some examples, the output module 515 may transmit output signals for display in a UI, for storage in a database or data store, for further processing at a server or server cluster, or for any other processes at any number of devices or systems. In some cases, the output module 515 may be a component of an I/O controller 710, as described with reference to FIG. 7.

For example, the web service manager 520 may include a request receiving component 525, a parameter determining component 530, an indication transmitting component 535, or any combination thereof. In some examples, the web service manager 520, or various components thereof, may be configured to perform various operations (e.g., receiving, monitoring, transmitting) using or otherwise in cooperation with the input module 510, the output module 515, or both. For example, the web service manager 520 may receive information from the input module 510, send information to the output module 515, or be integrated in combination with the input module 510, the output module 515, or both to receive information, transmit information, or perform various other operations, as described herein.

The web service manager 520 may support data processing in accordance with examples disclosed herein. The request receiving component 525 may be configured as or otherwise support a means for receiving, from a client of a web service, a request for a web component included in a web page supported by the web service, the web component associated with a data structure that defines one or more design characteristics of the web component. The parameter determining component 530 may be configured as or otherwise support a means for determining configuration parameters that define one or more stylistic characteristics of the web component based on data attributes of the web page and the data structure associated with the web component, where the configuration parameters are determined using a model trained on a corpus of web pages supported by the web service. The indication transmitting component 535 may be configured as or otherwise support a means for transmitting, to the client and in response to the request, an indication of the configuration parameters for the web component, where the indication is configured to display the web component according to the one or more stylistic characteristics defined by the configuration parameters.

Figure 6:
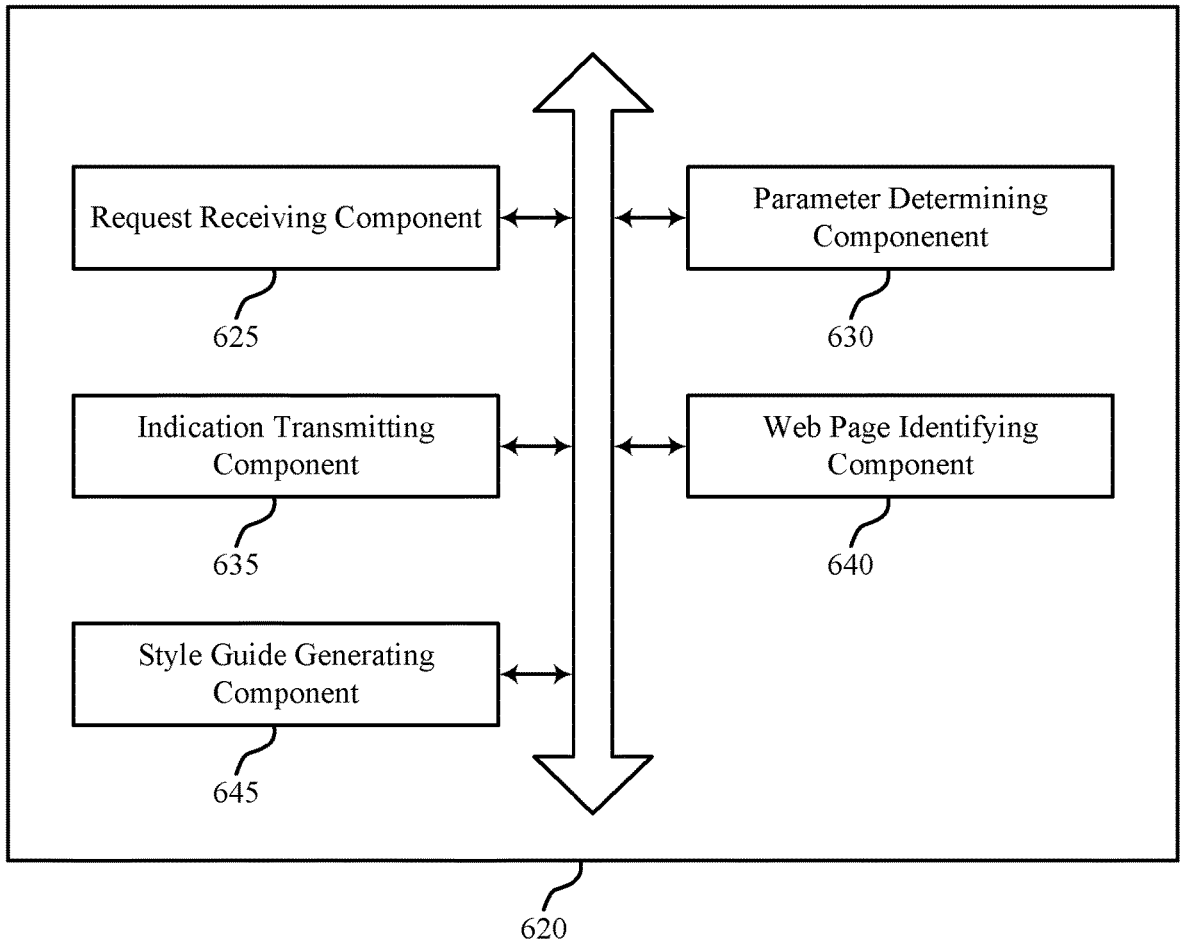
FIG. 6 shows a block diagram of a web service manager that supports techniques for automatically configuring web components in accordance with aspects of the present disclosure.

FIG. 6 shows a block diagram 600 of a web service manager 620 that supports techniques for automatically configuring web components in accordance with aspects of the present disclosure. The web service manager 620 may be an example of aspects of a web service manager 520 described with reference to FIG. 5. The web service manager 620, or various components thereof, may be an example of means for performing various aspects of techniques for automatically configuring web components, as described herein. For example, the web service manager 620 may include a request receiving component 625, a parameter determining component 630, an indication transmitting component 635, a web page identifying component 640, a style guide generating component 645, or any combination thereof. Each of these components may communicate, directly or indirectly, with one another (e.g., via one or more buses).

The web service manager 620 may support data processing in accordance with examples disclosed herein. The request receiving component 625 may be configured as or otherwise support a means for receiving, from a client of a web service, a request for a web component included in a web page supported by the web service, the web component associated with a data structure that defines one or more design characteristics of the web component. The parameter determining component 630 may be configured as or otherwise support a means for determining configuration parameters that define one or more stylistic characteristics of the web component based on data attributes of the web page and the data structure associated with the web component, where the configuration parameters are determined using a model trained on a corpus of web pages supported by the web service. The indication transmitting component 635 may be configured as or otherwise support a means for transmitting, to the client and in response to the request, an indication of the configuration parameters for the web component, where the indication is configured to display the web component according to the one or more stylistic characteristics defined by the configuration parameters.

In some examples, the web page identifying component 640 may be configured as or otherwise support a means for identifying multiple web components in the corpus of web pages that are associated with the data structure of the web component, where the multiple web components are identified using the model trained on the corpus of web pages.

In some examples, to support determining the configuration parameters for the web component, the parameter determining component 630 may be configured as or otherwise support a means for determining the configuration parameters for the web component based on stylistic characteristics of the identified web components in the corpus of web pages supported by the web service.

In some examples, the style guide generating component 645 may be configured as or otherwise support a means for generating a style guide for the web page using the model trained on the corpus of web pages supported by the web service, where the style guide includes stylistic characteristics of other web components included in the web page.

In some examples, to support determining the configuration parameters for the web component, the parameter determining component 630 may be configured as or otherwise support a means for determining the configuration parameters that define the one or more stylistic characteristics of the web component based on the stylistic characteristics in the style guide generated by the model. In some examples, the model is configured to generate the style guide by using one or more APIs to perform a page segmentation procedure on the web page.

In some examples, the request receiving component 625 may be configured as or otherwise support a means for receiving, from the client, a second request for a second web component included in a second web page supported by the web service, the second web component associated with the data structure of the web component. In some examples, the parameter determining component 630 may be configured as or otherwise support a means for determining configuration parameters for the second web component based on data attributes of the second web page and the data structure associated with the second web component, where the configuration parameters for the second web component are different from the configuration parameters for the web component.

In some examples, to support transmitting the indication of the configuration parameters for the web component, the indication transmitting component 635 may be configured as or otherwise support a means for transmitting, to the client, the indication of the configuration parameters for the web component based on determining that the one or more design characteristics of the data structure of the web component are stored in a cache associated with the client.

In some examples, the corpus of web pages supported by the web service include stylistic annotations that are used to train the model. In some examples, the model is configured to automatically determine stylistic characteristics for the web component based on the data structure of the web component, the data attributes of the web page, data attributes associated with the corpus of web pages supported by the web service, or a combination thereof.

In some examples, the configuration parameters of the web component include HTML properties, CSS properties, or both. In some examples, the data structure of the web component is defined using one or more HTML annotations. In some examples, the web component includes a data table, a navigation menu, a banner, a product tile, a search bar, or a combination thereof. In some examples, the one or more stylistic characteristics of the web component include a font, a font size, a font color, a background color, a text alignment, a line spacing, or a combination thereof.

Figure 7:
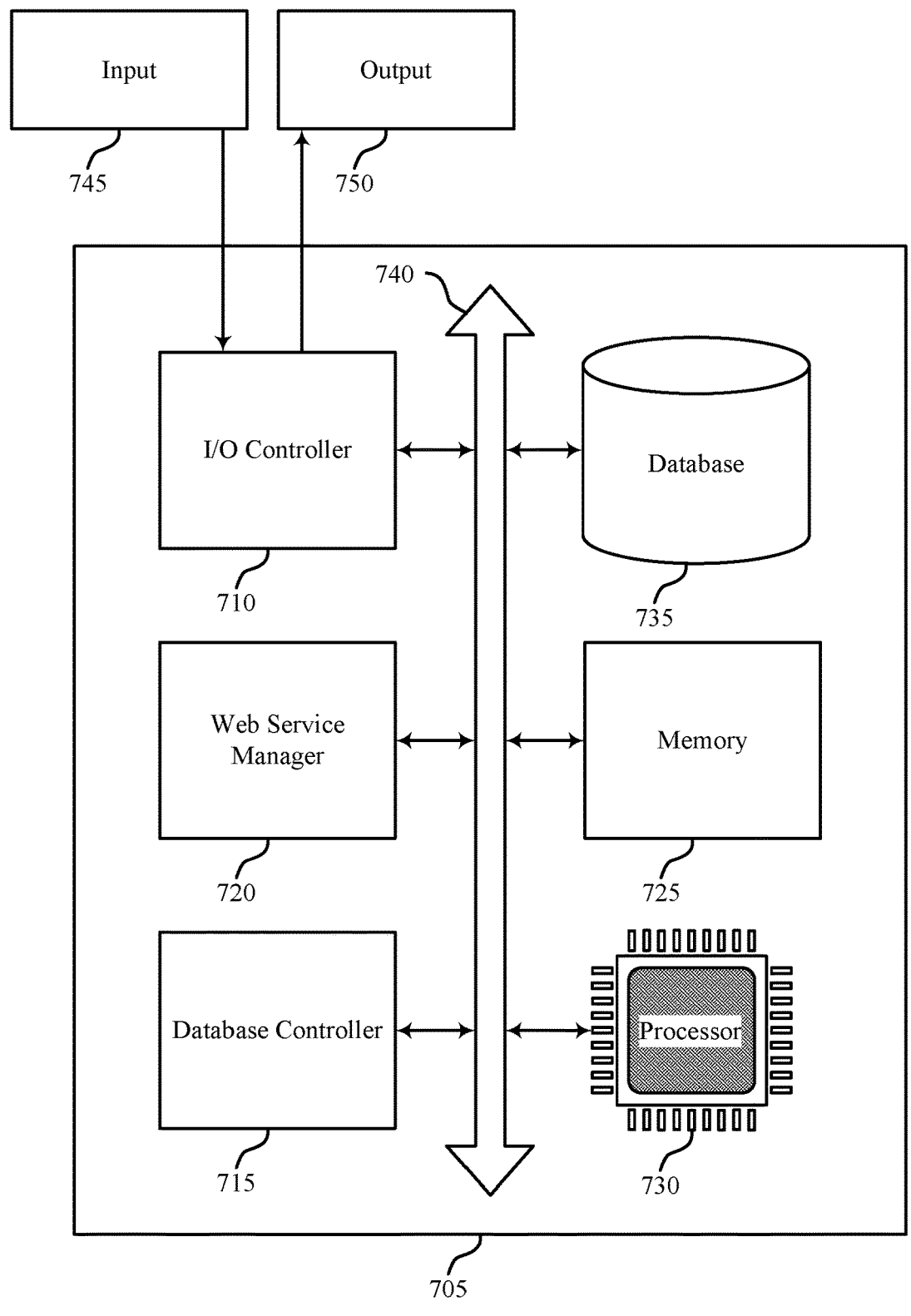
FIG. 7 shows a diagram of a system including a device that supports techniques for automatically configuring web components in accordance with aspects of the present disclosure.

FIG. 7 shows a diagram of a system 700 including a device 705 that supports techniques for automatically configuring web components in accordance with aspects of the present disclosure. The device 705 may be an example of or include the components of a device 505, as described herein. The device 705 may include components for data communications including components for transmitting and receiving communications, such as a web service manager 720, an I/O controller 710, a database controller 715, a memory 725, a processor 730, and a database 735. These components may be in electronic communication or otherwise coupled (e.g., operatively, communicatively, functionally, electronically, electrically) via one or more buses (e.g., a bus 740).

The I/O controller 710 may manage input signals 745 and output signals 750 for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. In other cases, the I/O controller 710 may represent or interact with a modem, a keyboard, a mouse, a touchscreen, or a similar device. In some cases, the I/O controller 710 may be implemented as part of a processor 730. In some examples, a user may interact with the device 705 via the I/O controller 710 or via hardware components controlled by the I/O controller 710.

The database controller 715 may manage data storage and processing in a database 735. In some cases, a user may interact with the database controller 715. In other cases, the database controller 715 may operate automatically without user interaction. The database 735 may be an example of a single database, a distributed database, multiple distributed databases, a data store, a data lake, or an emergency backup database.

Memory 725 may include random-access memory (RAM) and read-only memory (ROM). The memory 725 may store computer-readable, computer-executable software including instructions that, when executed, cause the processor 730 to perform various functions described herein. In some cases, the memory 725 may contain, among other things, a basic I/O system (BIOS) which may control basic hardware or software operation such as the interaction with peripheral components or devices.

The processor 730 may include an intelligent hardware device, (e.g., a general-purpose processor, a digital signal processor (DSP), a central processing unit (CPU), a graphics processing unit (GPU), a microcontroller, an application-specific integrated circuit (ASIC), a field-programmable gate array (FPGA), a programmable logic device, a discrete gate or transistor logic component, a discrete hardware component, or any combination thereof). In some cases, the processor 730 may be configured to operate a memory array using a memory controller. In other cases, a memory controller may be integrated into the processor 730. The processor 730 may be configured to execute computer-readable instructions stored in a memory 725 to perform various functions (e.g., functions or tasks supporting techniques for automatically configuring web components).

The web service manager 720 may support data processing in accordance with examples disclosed herein. For example, the web service manager 720 may be configured as or otherwise support a means for receiving, from a client of a web service, a request for a web component included in a web page supported by the web service, the web component associated with a data structure that defines one or more design characteristics of the web component. The web service manager 720 may be configured as or otherwise support a means for determining configuration parameters that define one or more stylistic characteristics of the web component based on data attributes of the web page and the data structure associated with the web component, where the configuration parameters are determined using a model trained on a corpus of web pages supported by the web service. The web service manager 720 may be configured as or otherwise support a means for transmitting, to the client and in response to the request, an indication of the configuration parameters for the web component, where the indication is configured to display the web component according to the one or more stylistic characteristics defined by the configuration parameters.

By including or configuring the web service manager 720 in accordance with examples described herein, the device 705 may enable web developers and digital content providers to design and style UI components with reduced manual interaction. More specifically, the described techniques may enable the device 705 to automatically theme different UI components in a web page by using web APIs and machine learning models to extract style information from the web page and other comparable web pages. Moreover, aspects of the present disclosure may enable client devices to locally cache and re-use UI components across different web pages, which may reduce the latency and signaling overhead associated with rendering these web pages at the client devices.

Figure 8:
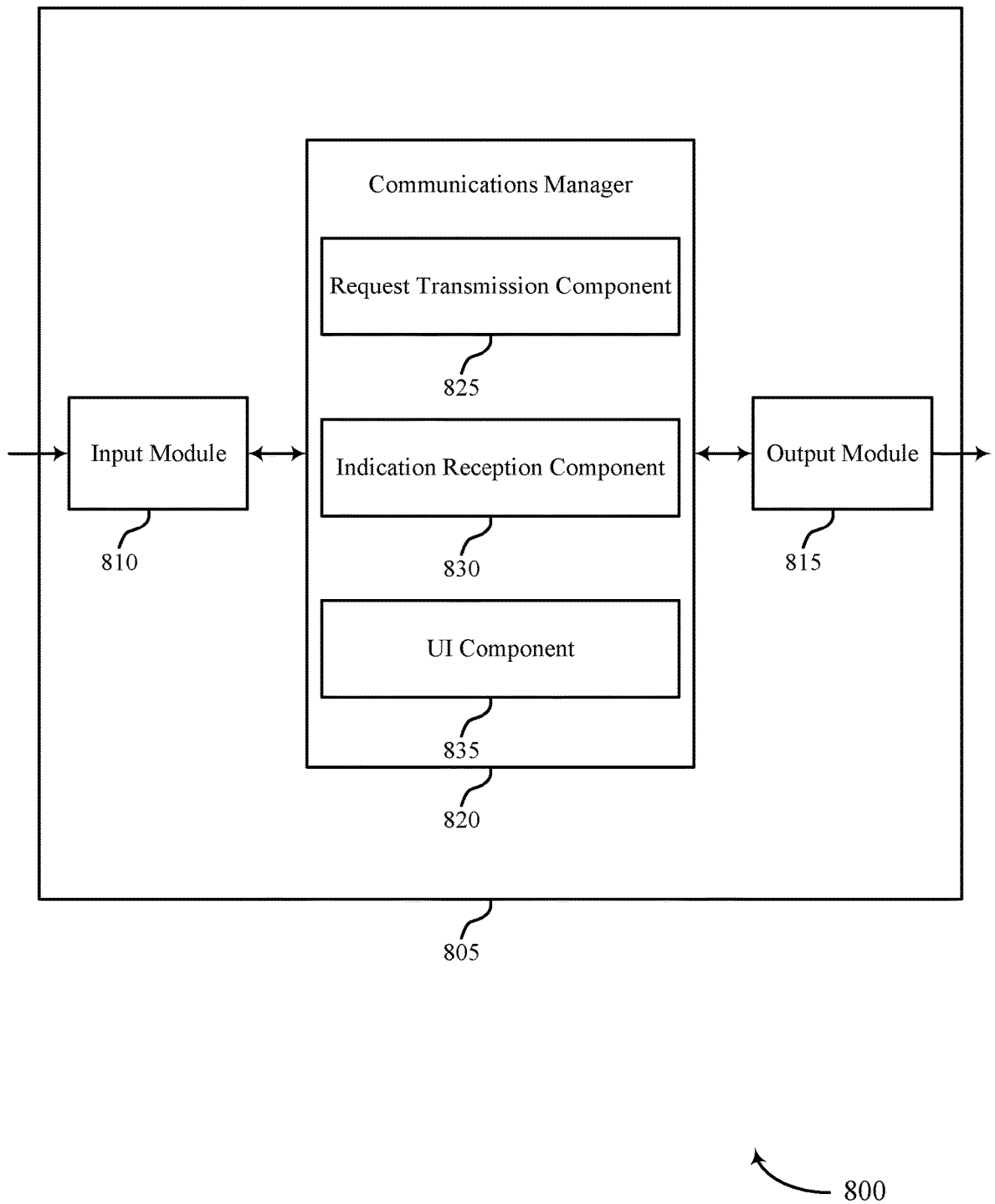
FIG. 8 shows a block diagram of an apparatus that supports techniques for automatically configuring web components in accordance with aspects of the present disclosure.

FIG. 8 shows a block diagram 800 of a device 805 that supports techniques for automatically configuring web components in accordance with aspects of the present disclosure. The device 805 may include an input module 810, an output module 815, and a communications manager 820. The device 805 may also include a processor. Each of these components may be in communication with one another (e.g., via one or more buses).

The input module 810 may manage input signals for the device 805. For example, the input module 810 may identify input signals based on an interaction with a modem, a keyboard, a mouse, a touchscreen, or a similar device. These input signals may be associated with user input or processing at other components or devices. In some cases, the input module 810 may utilize an operating system such as iOS®, ANDROID®, MS-DOS®, MS-WINDOWS®, OS/2®, UNIX®, LINUX®, or another known operating system to handle input signals. The input module 810 may send aspects of these input signals to other components of the device 805 for processing. For example, the input module 810 may transmit input signals to the communications manager 820 to support techniques for automatically configuring web components. In some cases, the input module 810 may be a component of an I/O controller 1010, as described with reference to FIG. 10.

The output module 815 may manage output signals for the device 805. For example, the output module 815 may receive signals from other components of the device 805, such as the communications manager 820, and may transmit these signals to other components or devices. In some examples, the output module 815 may transmit output signals for display in a UI, for storage in a database or data store, for further processing at a server or server cluster, or for any other processes at any number of devices or systems. In some cases, the output module 815 may be a component of an I/O controller 1010, as described with reference to FIG. 10.

For example, the communications manager 820 may include a request transmission component 825, an indication reception component 830, a UI component 835, or any combination thereof. In some examples, the communications manager 820, or various components thereof, may be configured to perform various operations (e.g., receiving, monitoring, transmitting) using or otherwise in cooperation with the input module 810, the output module 815, or both. For example, the communications manager 820 may receive information from the input module 810, send information to the output module 815, or be integrated in combination with the input module 810, the output module 815, or both to receive information, transmit information, or perform various other operations, as described herein.

The communications manager 820 may support data processing in accordance with examples disclosed herein. The request transmission component 825 may be configured as or otherwise support a means for transmitting, to a web service, a request for a web component included in a web page supported by the web service, the web component associated with a data structure that defines one or more design characteristics of the web component. The indication reception component 830 may be configured as or otherwise support a means for receiving, from the web service and in response to the request, an indication of configuration parameters that define one or more stylistic characteristics of the web component, where the configuration parameters are based on data attributes of the web page and the data structure associated with the web component. The UI component 835 may be configured as or otherwise support a means for displaying, at a UI associated with a client of the web service, the web component according to the one or more stylistic characteristics defined by the configuration parameters.

Figure 9:
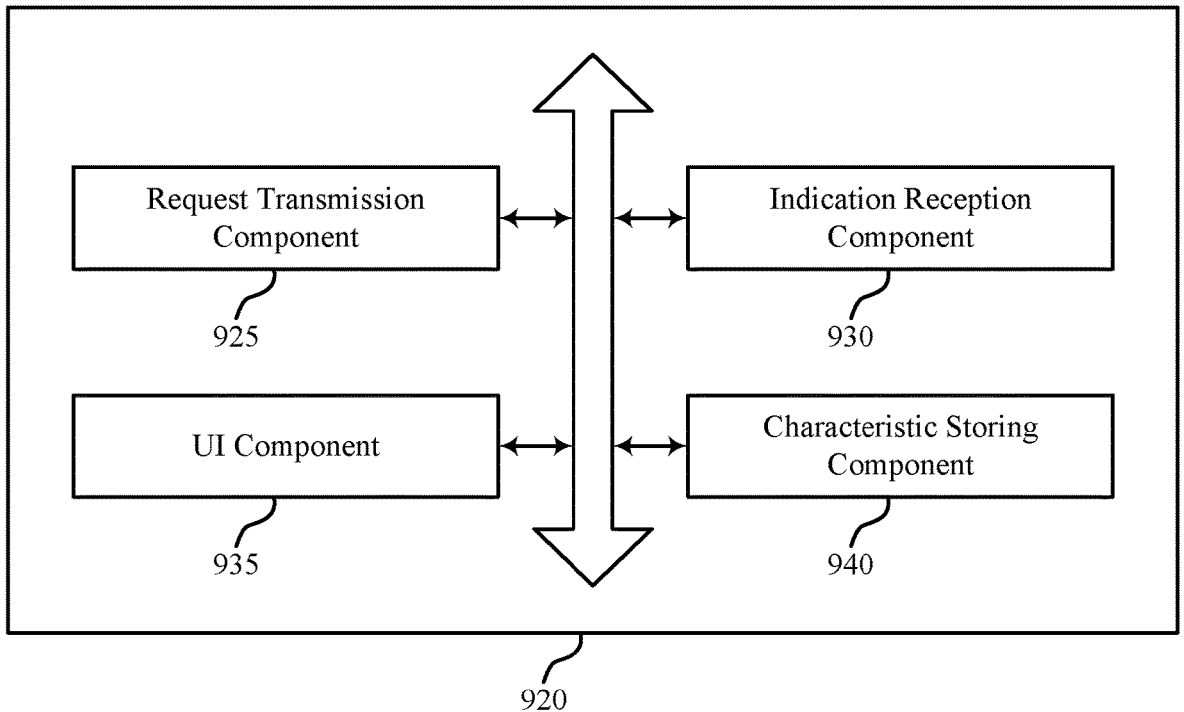
FIG. 9 shows a block diagram of a communications manager that supports techniques for automatically configuring web components in accordance with aspects of the present disclosure.

FIG. 9 shows a block diagram 900 of a communications manager 920 that supports techniques for automatically configuring web components in accordance with aspects of the present disclosure. The communications manager 920 may be an example of aspects of a communications manager 820 described with reference to FIG. 8. The communications manager 920, or various components thereof, may be an example of means for performing various aspects of techniques for automatically configuring web components, as described herein. For example, the communications manager 920 may include a request transmission component 925, an indication reception component 930, a UI component 935, a characteristic storing component 940, or any combination thereof. Each of these components may communicate, directly or indirectly, with one another (e.g., via one or more buses).

The communications manager 920 may support data processing in accordance with examples disclosed herein. The request transmission component 925 may be configured as or otherwise support a means for transmitting, to a web service, a request for a web component included in a web page supported by the web service, the web component associated with a data structure that defines one or more design characteristics of the web component. The indication reception component 930 may be configured as or otherwise support a means for receiving, from the web service and in response to the request, an indication of configuration parameters that define one or more stylistic characteristics of the web component, where the configuration parameters are based on data attributes of the web page and the data structure associated with the web component. The UI component 935 may be configured as or otherwise support a means for displaying, at a UI associated with a client of the web service, the web component according to the one or more stylistic characteristics defined by the configuration parameters.

In some examples, the characteristic storing component 940 may be configured as or otherwise support a means for storing the one or more design characteristics of the web component in a cache. In some examples, the UI component 935 may be configured as or otherwise support a means for displaying, at the UI associated with the client of the web service, a second web component according to the one or more design characteristics stored in the cache, where the second web component is associated with the data structure of the web component.

In some examples, to support displaying the second web component, the UI component 935 may be configured as or otherwise support a means for displaying, at the UI associated with the client of the web service, the second web component according to stylistic characteristics that are different from the stylistic characteristics of the web component.

In some examples, to support displaying the web component, the UI component 935 may be configured as or otherwise support a means for displaying the web component at the UI associated with the client of the web service based on using JavaScript hooks within the data structure to apply the one or more stylistic characteristics to the web component in accordance with the configuration parameters. In some examples, the one or more stylistic characteristics of the web component are determined using a model trained on a corpus of web pages supported by the web service.

Figure 10:
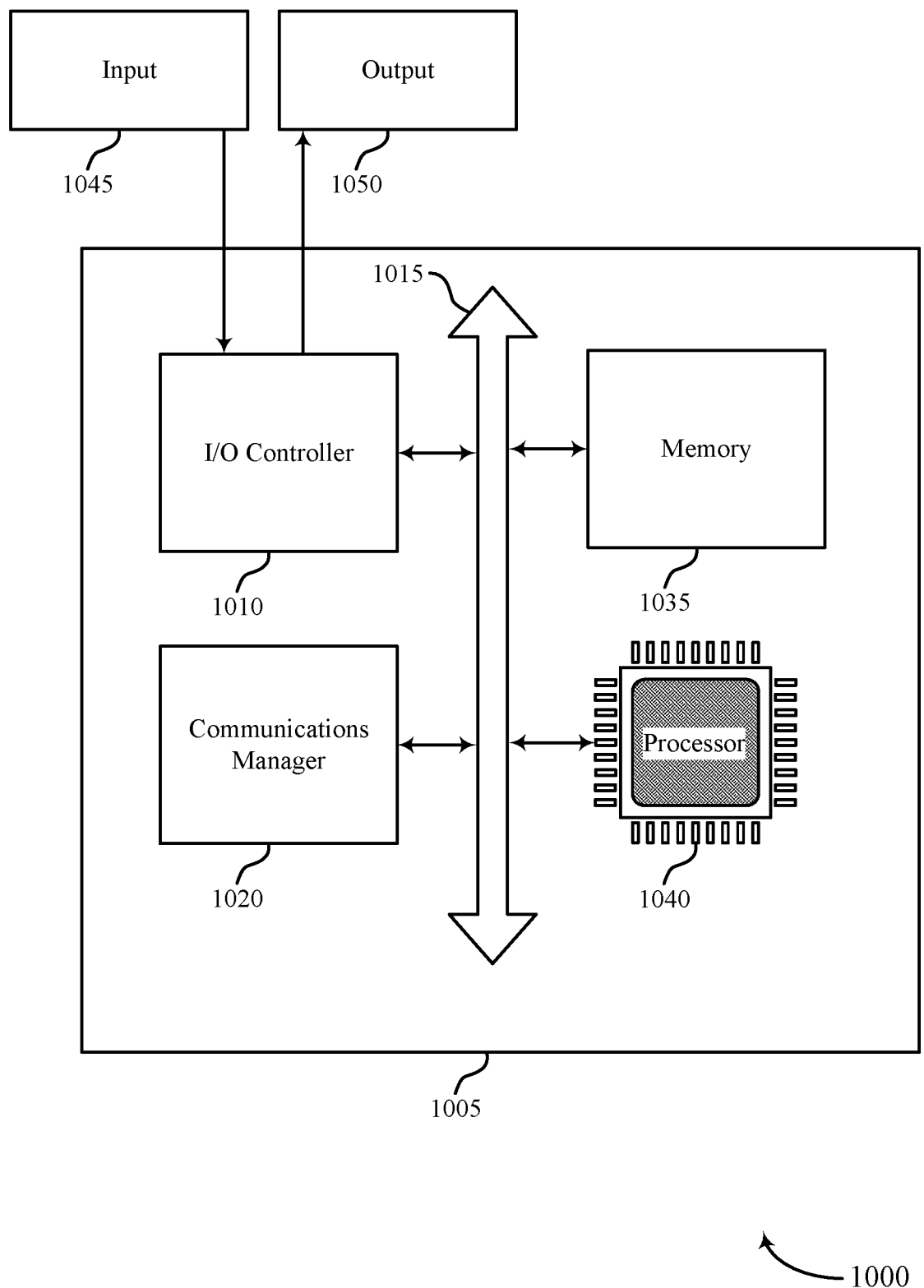
FIG. 10 shows a diagram of a system including a device that supports techniques for automatically configuring web components in accordance with aspects of the present disclosure.

FIG. 10 shows a diagram of a system 1000 including a device 1005 that supports techniques for automatically configuring web components in accordance with aspects of the present disclosure. The device 1005 may be an example of or include the components of a device 805, as described herein. The device 1005 may include components for data communications including components for transmitting and receiving communications, such as a communications manager 1020, an I/O controller 1010, a memory 1035, and a processor 1040. These components may be in electronic communication or otherwise coupled (e.g., operatively, communicatively, functionally, electronically, electrically) via one or more buses (e.g., a bus 1015).

The I/O controller 1010 may manage input signals 1045 and output signals 1050 for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. In other cases, the I/O controller 1010 may represent or interact with a modem, a keyboard, a mouse, a touchscreen, or a similar device. In some cases, the I/O controller 1010 may be implemented as part of a processor 1040. In some examples, a user may interact with the device 1005 via the I/O controller 1010 or via hardware components controlled by the I/O controller 1010.

Memory 1035 may include RAM and ROM. The memory 1035 may store computer-readable, computer-executable software including instructions that, when executed, cause the processor 1040 to perform various functions described herein. In some cases, the memory 1035 may contain, among other things, a BIOS which may control basic hardware or software operation such as the interaction with peripheral components or devices.

The processor 1040 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory 1035 to perform various functions (e.g., functions or tasks supporting techniques for automatically configuring web components).

The communications manager 1020 may support data processing in accordance with examples disclosed herein. For example, the communications manager 1020 may be configured as or otherwise support a means for transmitting, to a web service, a request for a web component included in a web page supported by the web service, the web component associated with a data structure that defines one or more design characteristics of the web component. The communications manager 1020 may be configured as or otherwise support a means for receiving, from the web service and in response to the request, an indication of configuration parameters that define one or more stylistic characteristics of the web component, where the configuration parameters are based on data attributes of the web page and the data structure associated with the web component. The communications manager 1020 may be configured as or otherwise support a means for displaying, at a UI associated with a client of the web service, the web component according to the one or more stylistic characteristics defined by the configuration parameters.

By including or configuring the communications manager 1020 in accordance with examples described herein, the device 1005 may enable web developers and digital content providers to design and style UI components with reduced manual interaction. More specifically, the described techniques may enable the device 1005 to automatically theme different UI components in a web page by using web APIs and machine learning models to extract style information from the web page and other comparable web pages. Moreover, aspects of the present disclosure may enable the device 1005 to locally cache and re-use UI components across different web pages, which may reduce the latency and signaling overhead associated with rendering these web pages at the device 1005.

Figure 11:
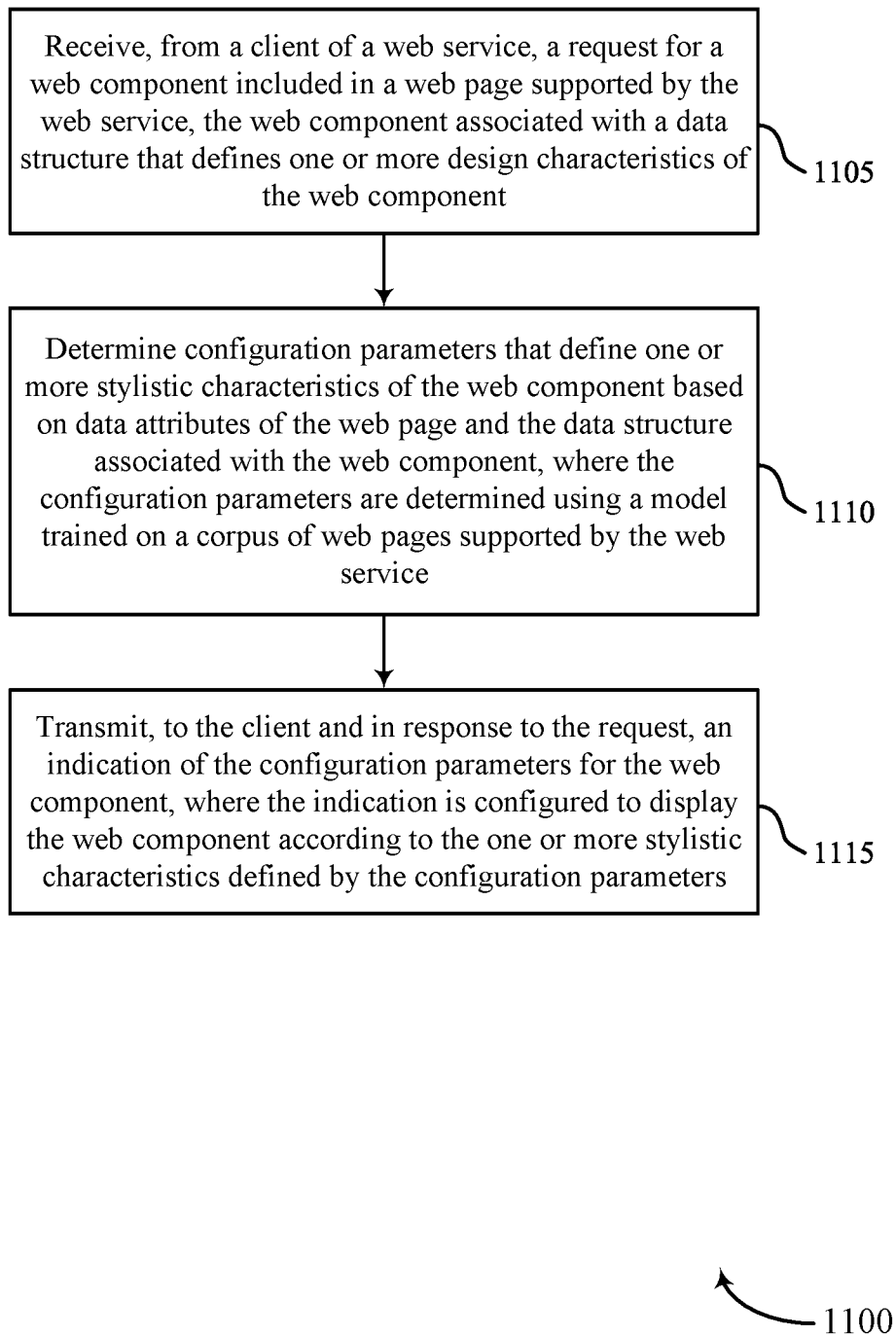
FIGS. 11 through 14 show flowcharts illustrating methods that support techniques for automatically configuring web components in accordance with aspects of the present disclosure.

FIG. 11 shows a flowchart illustrating a method 1100 that supports techniques for automatically configuring web components in accordance with aspects of the present disclosure. The operations of the method 1100 may be implemented by a web service or aspects of a web service, as described herein. For example, the operations of the method 1100 may be performed by a web service supported by a cloud platform 115, as described with reference to FIGS. 1 through 7. In some examples, a web service may execute a set of instructions to control the functional elements of the web service to perform the described functions. Additionally, or alternatively, the web service may perform aspects of the described functions using special-purpose hardware.

At 1105, the method may include receiving, from a client of a web service, a request for a web component included in a web page supported by the web service, the web component associated with a data structure that defines one or more design characteristics of the web component. The operations of 1105 may be performed in accordance with examples disclosed herein. In some examples, aspects of the operations of 1105 may be performed by a request receiving component 625, as described with reference to FIG. 6.

At 1110, the method may include determining configuration parameters that define one or more stylistic characteristics of the web component based on data attributes of the web page and the data structure associated with the web component, where the configuration parameters are determined using a model trained on a corpus of web pages supported by the web service. The operations of 1110 may be performed in accordance with examples disclosed herein. In some examples, aspects of the operations of 1110 may be performed by a parameter determining component 630, as described with reference to FIG. 6.

At 1115, the method may include transmitting, to the client and in response to the request, an indication of the configuration parameters for the web component, where the indication is configured to display the web component according to the one or more stylistic characteristics defined by the configuration parameters. The operations of 1115 may be performed in accordance with examples disclosed herein. In some examples, aspects of the operations of 1115 may be performed by an indication transmitting component 635, as described with reference to FIG. 6.

Figure 12:
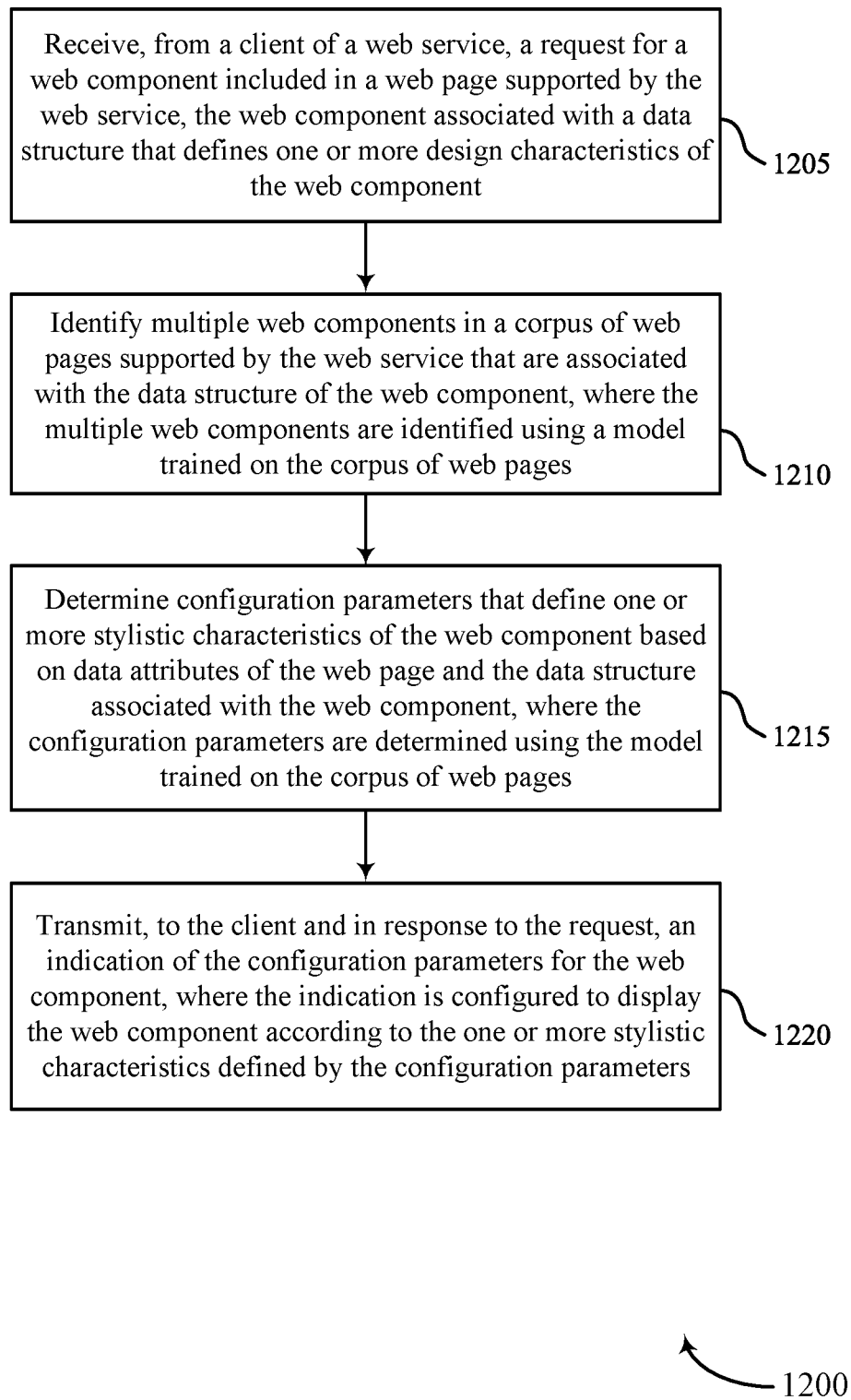

FIG. 12 shows a flowchart illustrating a method 1200 that supports techniques for automatically configuring web components in accordance with aspects of the present disclosure.

The operations of the method 1200 may be implemented by a web service or aspects of a web service, as described herein. For example, the operations of the method 1200 may be performed by a web service supported by a cloud platform 115, as described with reference to FIGS. 1 through 7. In some examples, a web service may execute a set of instructions to control the functional elements of the web service to perform the described functions. Additionally, or alternatively, the web service may perform aspects of the described functions using special-purpose hardware.

At 1205, the method may include receiving, from a client of a web service, a request for a web component included in a web page supported by the web service, the web component associated with a data structure that defines one or more design characteristics of the web component. The operations of 1205 may be performed in accordance with examples disclosed herein. In some examples, aspects of the operations of 1205 may be performed by a request receiving component 625, as described with reference to FIG. 6.

At 1210, the method may include identifying multiple web components in a corpus of web pages supported by the web service that are associated with the data structure of the web component, where the multiple web components are identified using a model that is trained on the corpus of web pages. The operations of 1210 may be performed in accordance with examples disclosed herein. In some examples, aspects of the operations of 1210 may be performed by a web page identifying component 640, as described with reference to FIG. 6.

At 1215, the method may include determining configuration parameters that define one or more stylistic characteristics of the web component based on data attributes of the web page and the data structure associated with the web component, where the configuration parameters are determined using the model trained on the corpus of web pages. The operations of 1215 may be performed in accordance with examples disclosed herein. In some examples, aspects of the operations of 1215 may be performed by a parameter determining component 630, as described with reference to FIG. 6.

At 1220, the method may include transmitting, to the client and in response to the request, an indication of the configuration parameters for the web component, where the indication is configured to display the web component according to the one or more stylistic characteristics defined by the configuration parameters. The operations of 1220 may be performed in accordance with examples disclosed herein. In some examples, aspects of the operations of 1220 may be performed by an indication transmitting component 635, as described with reference to FIG. 6.

Figure 13:
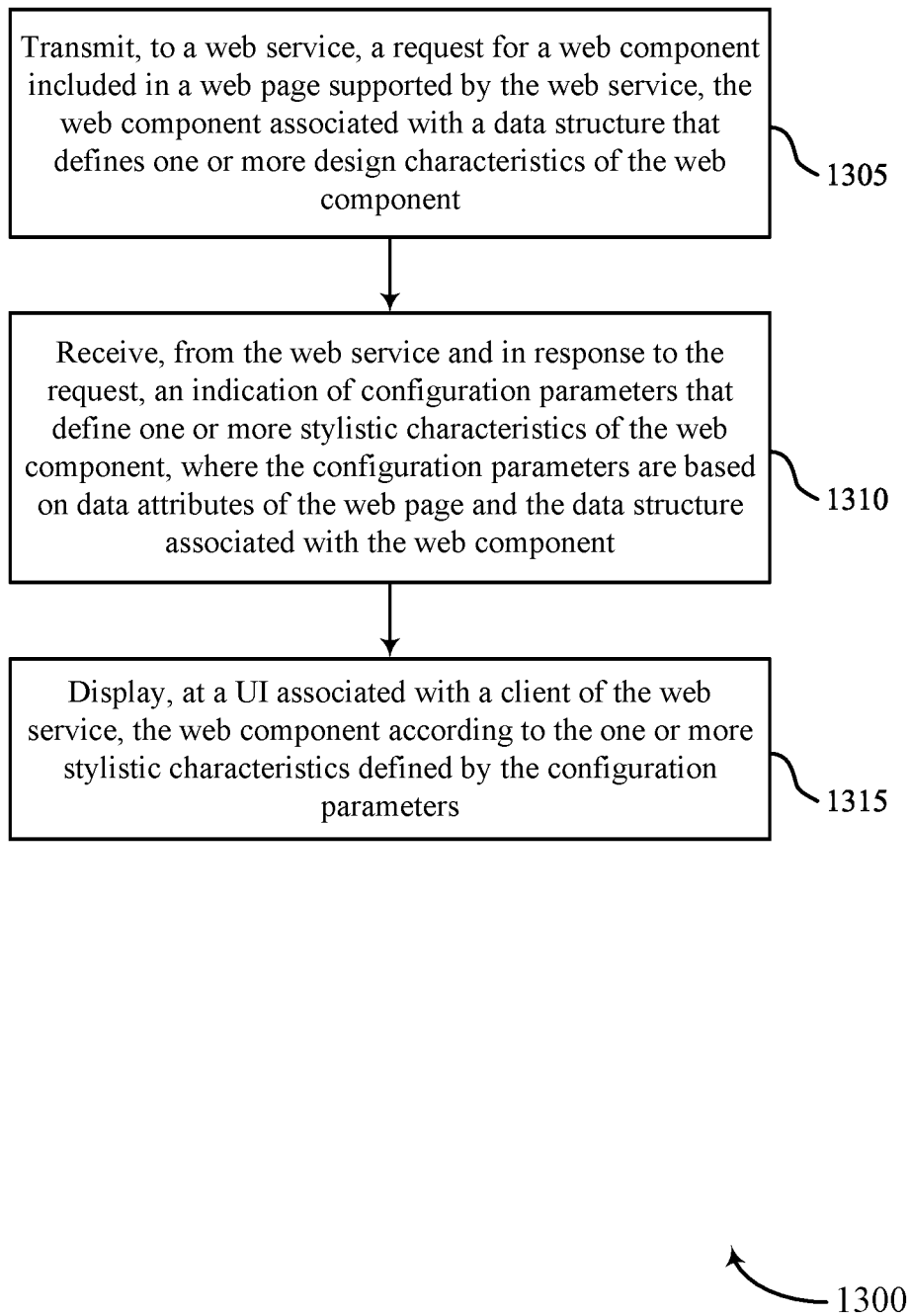

FIG. 13 shows a flowchart illustrating a method 1300 that supports techniques for automatically configuring web components in accordance with aspects of the present disclosure. The operations of the method 1300 may be implemented by a client device or components of a client device, as described herein. In some examples, operations of the method 1300 may be performed by a contact 110, as described with reference to FIGS. 1 through 4 and 8 through 10. In some examples, a client device may execute a set of instructions to control the functional elements of the client device to perform the described functions. Additionally, or alternatively, the client device may perform aspects of the described functions using special-purpose hardware.

At 1305, the method may include transmitting, to a web service, a request for a web component included in a web page supported by the web service, the web component associated with a data structure that defines one or more design characteristics of the web component. The operations of 1305 may be performed in accordance with examples disclosed herein. In some examples, aspects of the operations of 1305 may be performed by a request transmission component 925, as described with reference to FIG. 9.

At 1310, the method may include receiving, from the web service and in response to the request, an indication of configuration parameters that define one or more stylistic characteristics of the web component, where the configuration parameters are based on data attributes of the web page and the data structure associated with the web component. The operations of 1310 may be performed in accordance with examples disclosed herein. In some examples, aspects of the operations of 1310 may be performed by an indication reception component 930, as described with reference to FIG. 9.

At 1315, the method may include displaying, at a UI associated with a client of the web service, the web component according to the one or more stylistic characteristics defined by the configuration parameters. The operations of 1315 may be performed in accordance with examples disclosed herein. In some examples, aspects of the operations of 1315 may be performed by a UI component 935, as described with reference to FIG. 9.

Figure 14:
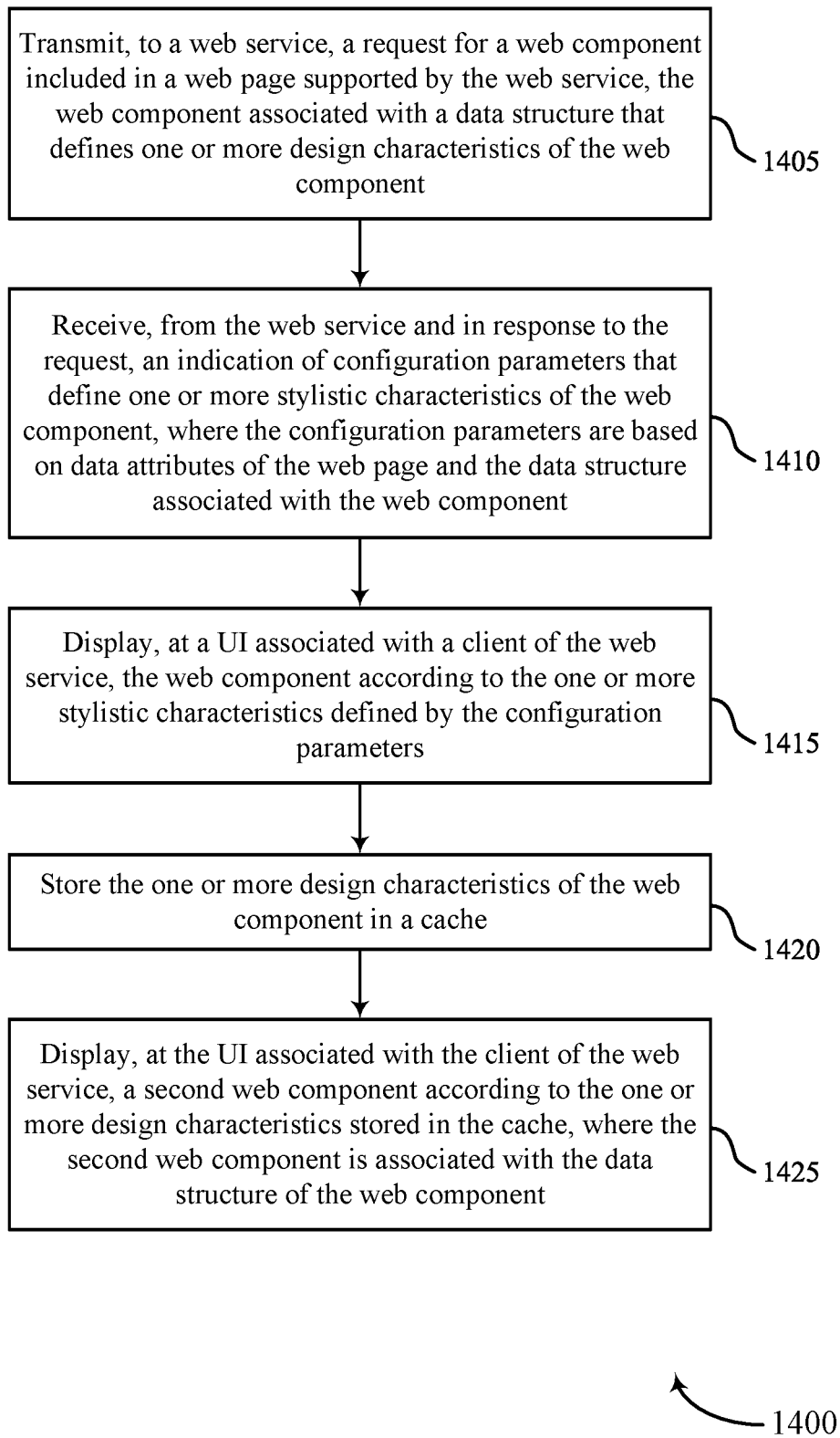

FIG. 14 shows a flowchart illustrating a method 1400 that supports techniques for automatically configuring web components in accordance with aspects of the present disclosure. The operations of the method 1400 may be implemented by a client device or components of a client device, as described herein. In some examples, operations of the method 1400 may be performed by a contact 110, as described with reference to FIGS. 1 through 4 and 8 through 10. In some examples, a client device may execute a set of instructions to control the functional elements of the client device to perform the described functions. Additionally, or alternatively, the client device may perform aspects of the described functions using special-purpose hardware.

At 1405, the method may include transmitting, to a web service, a request for a web component included in a web page supported by the web service, the web component associated with a data structure that defines one or more design characteristics of the web component. The operations of 1405 may be performed in accordance with examples disclosed herein. In some examples, aspects of the operations of 1405 may be performed by a request transmission component 925, as described with reference to FIG. 9.

At 1410, the method may include receiving, from the web service and in response to the request, an indication of configuration parameters that define one or more stylistic characteristics of the web component, where the configuration parameters are based on data attributes of the web page and the data structure associated with the web component. The operations of 1410 may be performed in accordance with examples disclosed herein. In some examples, aspects of the operations of 1410 may be performed by an indication reception component 930, as described with reference to FIG. 9.

At 1415, the method may include displaying, at a UI associated with a client of the web service, the web component according to the one or more stylistic characteristics defined by the configuration parameters. The operations of 1415 may be performed in accordance with examples disclosed herein. In some examples, aspects of the operations of 1415 may be performed by a UI component 935, as described with reference to FIG. 9.

At 1420, the method may include storing the one or more design characteristics of the web component in a cache. The operations of 1420 may be performed in accordance with examples disclosed herein. In some examples, aspects of the operations of 1420 may be performed by a characteristic storing component 940, as described with reference to FIG. 9.

At 1425, the method may include displaying, at the UI associated with the client of the web service, a second web component according to the one or more design characteristics stored in the cache, where the second web component is associated with the data structure of the web component. The operations of 1425 may be performed in accordance with examples disclosed herein. In some examples, aspects of the operations of 1425 may be performed by a UI component 935, as described with reference to FIG. 9.

A method for data processing is described. The method may include receiving, from a client of a web service, a request for a web component included in a web page supported by the web service, the web component associated with a data structure that defines one or more design characteristics of the web component. The method may further include determining configuration parameters that define one or more stylistic characteristics of the web component based on data attributes of the web page and the data structure associated with the web component, where the configuration parameters are determined using a model trained on a corpus of web pages supported by the web service. The method may further include transmitting, to the client and in response to the request, an indication of the configuration parameters for the web component, where the indication is configured to display the web component according to the one or more stylistic characteristics defined by the configuration parameters.

An apparatus for data processing is described. The apparatus may include a processor, memory coupled with the processor, and instructions stored in the memory. The instructions may be executable by the processor to cause the apparatus to receive, from a client of a web service, a request for a web component included in a web page supported by the web service, the web component associated with a data structure that defines one or more design characteristics of the web component. The instructions may be further executable by the processor to cause the apparatus to determine configuration parameters that define one or more stylistic characteristics of the web component based on data attributes of the web page and the data structure associated with the web component, where the configuration parameters are determined using a model trained on a corpus of web pages supported by the web service. The instructions may be further executable by the processor to cause the apparatus to transmit, to the client and in response to the request, an indication of the configuration parameters for the web component, where the indication is configured to display the web component according to the one or more stylistic characteristics defined by the configuration parameters.

Another apparatus for data processing is described. The apparatus may include means for receiving, from a client of a web service, a request for a web component included in a web page supported by the web service, the web component associated with a data structure that defines one or more design characteristics of the web component. The apparatus may also include means for determining configuration parameters that define one or more stylistic characteristics of the web component based on data attributes of the web page and the data structure associated with the web component, where the configuration parameters are determined using a model trained on a corpus of web pages supported by the web service. The apparatus may also include means for transmitting, to the client and in response to the request, an indication of the configuration parameters for the web component, where the indication is configured to display the web component according to the one or more stylistic characteristics defined by the configuration parameters.

A non-transitory computer-readable medium storing code for data processing is described. The code may include instructions executable by a processor to receive, from a client of a web service, a request for a web component included in a web page supported by the web service, the web component associated with a data structure that defines one or more design characteristics of the web component. The instructions may be further executable by the processor to determine configuration parameters that define one or more stylistic characteristics of the web component based on data attributes of the web page and the data structure associated with the web component, where the configuration parameters are determined using a model trained on a corpus of web pages supported by the web service. The instructions may be further executable by the processor to transmit, to the client and in response to the request, an indication of the configuration parameters for the web component, where the indication is configured to display the web component according to the one or more stylistic characteristics defined by the configuration parameters.

Some examples of the method, apparatuses, and non-transitory computer-readable medium described herein may further include operations, features, means, or instructions for identifying multiple web components in the corpus of web pages that are associated with the data structure of the web component, where the multiple web components are identified using the model trained on the corpus of web pages.

In some examples of the method, apparatuses, and non-transitory computer-readable medium described herein, determining the configuration parameters for the web component may include operations, features, means, or instructions for determining the configuration parameters for the web component based on stylistic characteristics of the identified web components in the corpus of web pages supported by the web service.

Some examples of the method, apparatuses, and non-transitory computer-readable medium described herein may further include operations, features, means, or instructions for generating a style guide for the web page using the model trained on the corpus of web pages supported by the web service, where the style guide includes stylistic characteristics of other web components included in the web page.

In some examples of the method, apparatuses, and non-transitory computer-readable medium described herein, determining the configuration parameters for the web component may include operations, features, means, or instructions for determining the configuration parameters that define the one or more stylistic characteristics of the web component based on the stylistic characteristics in the style guide generated by the model.

In some examples of the method, apparatuses, and non-transitory computer-readable medium described herein, the model may be configured to generate the style guide by using one or more APIs to perform a page segmentation procedure on the web page.

Some examples of the method, apparatuses, and non-transitory computer-readable medium described herein may further include operations, features, means, or instructions for receiving, from the client, a second request for a second web component included in a second web page supported by the web service, the second web component associated with the data structure of the web component and determining configuration parameters for the second web component based on data attributes of the second web page and the data structure associated with the second web component, where the configuration parameters for the second web component are different from the configuration parameters for the web component.

In some examples of the method, apparatuses, and non-transitory computer-readable medium described herein, transmitting the indication of the configuration parameters for the web component may include operations, features, means, or instructions for transmitting, to the client, the indication of the configuration parameters for the web component based on determining that the one or more design characteristics associated with the data structure of the web component are stored in a cache associated with the client.

In some examples of the method, apparatuses, and non-transitory computer-readable medium described herein, the corpus of web pages supported by the web service includes stylistic annotations that are used to train the model.

In some examples of the method, apparatuses, and non-transitory computer-readable medium described herein, the model may be configured to automatically determine stylistic characteristics for the web component based on the data structure of the web component, the data attributes of the web page, data attributes associated with the corpus of web pages supported by the web service, or a combination thereof.

In some examples of the method, apparatuses, and non-transitory computer-readable medium described herein, the configuration parameters of the web component include HTML properties, CSS properties, or both.

In some examples of the method, apparatuses, and non-transitory computer-readable medium described herein, the data structure of the web component may be defined using one or more HTML annotations.

In some examples of the method, apparatuses, and non-transitory computer-readable medium described herein, the web component includes a data table, a navigation menu, a banner, a product tile, a search bar, or a combination thereof.

In some examples of the method, apparatuses, and non-transitory computer-readable medium described herein, the one or more stylistic characteristics of the web component include a font, a font size, a font color, a background color, a text alignment, a line spacing, or a combination thereof.

A method for data processing is described. The method may include transmitting, to a web service, a request for a web component included in a web page supported by the web service, the web component associated with a data structure that defines one or more design characteristics of the web component. The method may further include receiving, from the web service and in response to the request, an indication of configuration parameters that define one or more stylistic characteristics of the web component, where the configuration parameters are based on data attributes of the web page and the data structure associated with the web component. The method may further include displaying, at a UI associated with a client of the web service, the web component according to the one or more stylistic characteristics defined by the configuration parameters.

An apparatus for data processing is described. The apparatus may include a processor, memory coupled with the processor, and instructions stored in the memory. The instructions may be executable by the processor to cause the apparatus to transmit, to a web service, a request for a web component included in a web page supported by the web service, the web component associated with a data structure that defines one or more design characteristics of the web component. The instructions may be further executable by the processor to cause the apparatus to receive, from the web service and in response to the request, an indication of configuration parameters that define one or more stylistic characteristics of the web component, where the configuration parameters are based on data attributes of the web page and the data structure associated with the web component. The instructions may be further executable by the processor to cause the apparatus to display, at a UI associated with a client of the web service, the web component according to the one or more stylistic characteristics defined by the configuration parameters.

Another apparatus for data processing is described. The apparatus may include means for transmitting, to a web service, a request for a web component included in a web page supported by the web service, the web component associated with a data structure that defines one or more design characteristics of the web component. The apparatus may also include means for receiving, from the web service and in response to the request, an indication of configuration parameters that define one or more stylistic characteristics of the web component, where the configuration parameters are based on data attributes of the web page and the data structure associated with the web component. The apparatus may also include means for displaying, at a UI associated with a client of the web service, the web component according to the one or more stylistic characteristics defined by the configuration parameters.

A non-transitory computer-readable medium storing code for data processing is described. The code may include instructions executable by a processor to transmit, to a web service, a request for a web component included in a web page supported by the web service, the web component associated with a data structure that defines one or more design characteristics of the web component. The instructions may be further executable by the processor to receive, from the web service and in response to the request, an indication of configuration parameters that define one or more stylistic characteristics of the web component, where the configuration parameters are based on data attributes of the web page and the data structure associated with the web component. The instructions may be further executable by the processor to display, at a UI associated with a client of the web service, the web component according to the one or more stylistic characteristics defined by the configuration parameters.

Some examples of the method, apparatuses, and non-transitory computer-readable medium described herein may further include operations, features, means, or instructions for storing the one or more design characteristics of the web component in a cache and displaying, at the UI associated with the client of the web service, a second web component according to the one or more design characteristics stored in the cache, where the second web component is associated with the data structure of the web component.

In some examples of the method, apparatuses, and non-transitory computer-readable medium described herein, displaying the second web component may include operations, features, means, or instructions for displaying, at the UI associated with the client of the web service, the second web component according to stylistic characteristics that are different from the stylistic characteristics of the web component.

In some examples of the method, apparatuses, and non-transitory computer-readable medium described herein, displaying the web component may include operations, features, means, or instructions for displaying the web component at the UI associated with the client of the web service based on using JavaScript hooks within the data structure to apply the one or more stylistic characteristics to the web component in accordance with the configuration parameters.

In some examples of the method, apparatuses, and non-transitory computer-readable medium described herein, the one or more stylistic characteristics of the web component may be determined using a model trained on a corpus of web pages supported by the web service.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:
1. A method for data processing, comprising:
receiving, from a client of a web service, a request for a web component included in a web page supported by the web service, the web component associated with a data structure that defines one or more design characteristics of the web component;

determining configuration parameters that define one or more stylistic characteristics of the web component based at least in part on data attributes of the web page and the data structure associated with the web component, wherein the configuration parameters are determined using a model trained on a corpus of web pages supported by the web service; and transmitting, to the client and in response to the request, an indication of the configuration parameters for the web component, wherein the indication is configured to display the web component according to the one or more stylistic characteristics defined by the configuration parameters.

2. The method of claim 1, further comprising:

identifying a plurality of web components in the corpus of web pages that are associated with the data structure of the web component, wherein the plurality of web components are identified using the model trained on the corpus of web pages.

3. The method of claim 2, wherein determining the configuration parameters for the web component comprises:

determining the configuration parameters for the web component based at least in part on stylistic characteristics of the identified plurality of web components in the corpus of web pages supported by the web service.

4. The method of claim 1, further comprising:

generating a style guide for the web page using the model trained on the corpus of web pages supported by the web service, wherein the style guide comprises stylistic characteristics of other web components included in the web page.

5. The method of claim 4, wherein determining the configuration parameters for the web component comprises:

determining the configuration parameters that define the one or more stylistic characteristics of the web component based at least in part on the stylistic characteristics in the style guide generated by the model.

6. The method of claim 4, wherein the model is configured to generate the style guide by using one or more application programming interfaces (APIs) to perform a page segmentation procedure on the web page.

7. The method of claim 1, further comprising:

receiving, from the client, a second request for a second web component included in a second web page supported by the web service, the second web component associated with the data structure of the web component; and determining configuration parameters for the second web component based at least in part on data attributes of the second web page and the data structure associated with the second web component, wherein the configuration parameters for the second web component are different from the configuration parameters for the web component.

8. The method of claim 1, wherein transmitting the indication of the configuration parameters for the web component comprises:

transmitting, to the client, the indication of the configuration parameters for the web component based at least in part on determining that the one or more design characteristics associated with the data structure of the web component are stored in a cache associated with the client.

9. The method of claim 1, wherein the corpus of web pages supported by the web service includes stylistic annotations that are used to train the model.

10. The method of claim 1, wherein the model is configured to automatically determine stylistic characteristics for the web component based at least in part on the data structure of the web component, the data attributes of the web page, data attributes associated with the corpus of web pages supported by the web service, or a combination thereof.

11. The method of claim 1, wherein the configuration parameters of the web component comprise hypertext markup language (HTML) properties, cascading style sheet (CSS) properties, or both.

12. The method of claim 1, wherein the data structure of the web component is defined using one or more hypertext markup language (HTML) annotations.

13. The method of claim 1, wherein the web component comprises a data table, a navigation menu, a banner, a product tile, a search bar, or a combination thereof.

14. The method of claim 1, wherein the one or more stylistic characteristics of the web component comprise a font, a font size, a font color, a background color, a text alignment, a line spacing, or a combination thereof.

15. An apparatus for data processing, comprising:

a processor;

memory coupled with the processor; and instructions stored in the memory and executable by the processor to cause the apparatus to:

receive, from a client of a web service, a request for a web component included in a web page supported by the web service, the web component associated with a data structure that defines one or more design characteristics of the web component;

determine configuration parameters that define one or more stylistic characteristics of the web component based at least in part on data attributes of the web page and the data structure associated with the web component, wherein the configuration parameters are determined using a model trained on a corpus of web pages supported by the web service; and transmit, to the client and in response to the request, an indication of the configuration parameters for the web component, wherein the indication is configured to display the web component according to the one or more stylistic characteristics defined by the configuration parameters.

16. The apparatus of claim 15, wherein the instructions are further executable by the processor to cause the apparatus to:

identify a plurality of web components in the corpus of web pages that are associated with the data structure of the web component, wherein the plurality of web components are identified using the model trained on the corpus of web pages.

17. The apparatus of claim 15, wherein the instructions are further executable by the processor to cause the apparatus to:

generate a style guide for the web page using the model trained on the corpus of web pages supported by the web service, wherein the style guide comprises stylistic characteristics of other web components included in the web page.

18. The apparatus of claim 15, wherein the instructions are further executable by the processor to cause the apparatus to:

receive, from the client, a second request for a second web component included in a second web page supported by the web service, the second web component associated with the data structure of the web component; and determine configuration parameters for the second web component based at least in part on data attributes of the second web page and the data structure associated with the second web component, wherein the configuration parameters for the second web component are different from the configuration parameters for the web component.

19. The apparatus of claim 15, wherein the instructions to transmit the indication of the configuration parameters for the web component are executable by the processor to cause the apparatus to:

transmit, to the client, the indication of the configuration parameters for the web component based at least in part on determining that the one or more design characteristics associated with the data structure of the web component are stored in a cache associated with the client.

20. A non-transitory computer-readable medium storing code for data processing, the code comprising instructions executable by a processor to:

receive, from a client of a web service, a request for a web component included in a web page supported by the web service, the web component associated with a data structure that defines one or more design characteristics of the web component;

determine configuration parameters that define one or more stylistic characteristics of the web component based at least in part on data attributes of the web page and the data structure associated with the web component, wherein the configuration parameters are determined using a model trained on a corpus of web pages supported by the web service; and transmit, to the client and in response to the request, an indication of the configuration parameters for the web component, wherein the indication is configured to display the web component according to the one or more stylistic characteristics defined by the configuration parameters.

* * * * *